US012732573B2

(12) United States Patent
Zhong et al.

(10) Patent No.: US 12,732,573 B2

(45) Date of Patent: Sep. 8, 2026

(54) ELECTRONIC DEVICE WITH MOVABLE LIFTING COMPONENT

(71) Applicant: HUAWEI TECHNOLOGIES CO., LTD., Shenzhen (CN)

(72) Inventors: Ding Zhong, Dongguan (CN); Wenwen Wu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 18/964,353

(22) Filed: Nov. 30, 2024

(65) Prior Publication Data

US 2025/0097332 A1 Mar. 20, 2025

Related U.S. Application Data

(63) Continuation of application No. PCT/CN2023/095369, filed on May 19, 2023.

(30) Foreign Application Priority Data

May 31, 2022 (CN) ........................ 202210610489.9

(51) Int. Cl.

| | |
|---|---|
| ***H04M 1/02*** | (2006.01) |
| ***G02B 7/02*** | (2021.01) |
| ***H04N 23/57*** | (2023.01) |

(52) U.S. Cl.

CPC .......... *H04M 1/0264* (2013.01); *G02B 7/021* (2013.01); *H04N 23/57* (2023.01)

(58) Field of Classification Search

CPC ........ G02B 13/009; G02B 7/021; G02B 7/22; G03B 13/32; G03B 2205/0046; G03B 30/00; G03B 5/00; H04M 1/0264; H04N 23/00; H04N 23/55; H04N 23/57

See application file for complete search history.

(56) References Cited

U.S. PATENT DOCUMENTS

| | | | | |
|---|---|---|---|---|
| 11,058,018 | B1 * | 7/2021 | Yoon | H04M 1/0237 |
| 12,063,429 | B2 * | 8/2024 | Ding | H04M 1/0264 |
| 2022/0146910 | A1 * | 5/2022 | Li | G02B 13/001 |
| 2023/0269449 | A1 * | 8/2023 | Yan | H04N 23/51 348/349 |

FOREIGN PATENT DOCUMENTS

| | | | | |
|---|---|---|---|---|
| CN | 110798594 A | | 2/2020 | |
| CN | 113347342 A | | 9/2021 | |
| CN | 114114595 A | * | 3/2022 | H04N 23/57 |
| KR | 20200097766 A | * | 8/2020 | H04N 23/55 |

* cited by examiner

*Primary Examiner* — Amy R Hsu

(57) ABSTRACT

An embodiment of this application provides an electronic device with a movable lifting component, including a base, a lifting component, and a first driving assembly, where the base is fastened to a rear cover of a housing of the electronic device, the first driving assembly rotatably matches the base, and the lifting component is sleeved on an inner side of the first driving assembly. The first driving assembly may rotate relative to the base, the first driving assembly drives the lifting component to move in a direction parallel to an optical axis toward the outside of the housing to form an avoidance space, and a first lens assembly may move in the avoidance space.

20 Claims, 13 Drawing Sheets

ELECTRONIC DEVICE WITH MOVABLE LIFTING COMPONENT

CROSS-REFERENCE TO RELATED APPLICATIONS

This application is a continuation of International Application No. PCT/CN2023/095369, filed on May 19, 2023, which claims priority to Chinese Patent Application No. 202210610489.9, filed on May 31, 2022. The disclosures of the aforementioned applications are hereby incorporated by reference in their entireties.

TECHNICAL FIELD

This application relates to the field of electronic device technologies, and in particular, to an electronic device with a movable lifting component.

BACKGROUND

Mobile phones, tablet computers, notebook computers, and wearable cameras each have a camera module to implement a photographing function, and the photographing function gradually becomes an important feature of such products and one of main indicators for evaluating performance of such devices. With continuous development of electronic devices, light and thin electronic devices become one of main development trends.

The camera module usually includes an image sensor and a lens assembly. Usually, the lens assembly may be disposed on a rear cover of the electronic device. An optical axis direction of the lens assembly is consistent with a thickness direction of the electronic device. Light in an environment may enter the camera module through the lens assembly, and is irradiated to the image sensor for imaging. However, to implement a zoom function of the camera module to meet a photographing requirement, the camera module may further include a driving motor. The driving motor can drive the lens assembly to move close to or away from the image sensor along an optical axis, change a distance between the lens assembly and the image sensor, and further change an image distance to achieve zoom effect. A distance at which the lens assembly can move is used as a zoom distance. A longer zoom distance helps achieve better photographing effect, for example, a larger wide angle or a longer focus length.

However, an increase in the zoom distance leads to an increase in a space occupied by the camera module, which is unfavorable to a thinning design requirement of the electronic device.

SUMMARY

This application provides an electronic device with a movable lifting component, to resolve a problem in an existing electronic device that a thickness of the electronic device increases due to an increase in a zoom distance requirement of a camera module, which is unfavorable to a thinning design of the electronic device.

This application provides an electronic device with a movable lifting component, including a housing and a camera module, where the housing includes a middle frame and a rear cover, the middle frame and the rear cover enclose an accommodation cavity, the camera module is disposed in the accommodation cavity, an avoidance hole communicating with the accommodation cavity is provided on the rear cover, and the camera module includes a first lens assembly.

The electronic device further includes a base, a lifting component, and a first driving assembly, where a light transmission component is disposed on the lifting component, the light transmission component is opposite to the avoidance hole, and the light transmission component is located on a side that is of the first lens assembly and that faces an object side. In other words, the first lens assembly is located between the light transmission component and an image sensor, and a space between the light transmission component and the image sensor is a movable space for implementing zooming by the first lens assembly.

The base is located in the accommodation cavity and is fastened to the rear cover of the housing, the base and the first driving assembly are of ring-shaped structures, the first driving assembly is disposed on the base and can rotate relative to the base, and the lifting component is sleeved on an inner side of the first driving assembly and moves accordingly with the first driving assembly.

When at least a part of the camera module needs to extend out of the housing, the first driving assembly can rotate relative to the base, the first driving assembly can drive the lifting component to move in a first direction toward the outside of the housing to form an avoidance space, the first direction is parallel to an optical axis direction of the first lens assembly, and the first lens assembly can move in the avoidance space.

Movement of the lifting component drives the light transmission component on the lifting component to move away from the image sensor, increases a distance between the light transmission component and the image sensor, releases a larger space between the light transmission component and the image sensor, and the released space can form the avoidance space. In this way, the movable space of the first lens assembly is expanded, so that the first lens assembly has a larger moving space to achieve zoom effect, and a zoom distance of the first lens assembly is increased, to meet a photographing requirement of the electronic device.

When at least a part of the camera module needs to retract into the housing, the first driving assembly can reversely rotate, so that the lifting component can reversely move, the distance between the light transmission component and the image sensor can be compressed, and an overall space occupied by the camera module, the lifting component, and the like in the optical axis direction is reduced. Therefore, impact on a thickness of the electronic device is reduced or eliminated, which facilitates a thinning design of the electronic device. A long zoom distance of the camera module can be implemented, photographing requirements such as a long focus length and a wide angle can be met, and good photographing effect can be achieved while ensuring that the electronic device can meet a light and thin experience requirement of a user.

In addition, mechanical driving of the movement of the lifting component is implemented through the matching of the first driving assembly and the lifting component, a structure is simple, and a structure of a driving mechanism for implementing the movement of the lifting component is simplified. In addition, the mechanical driving mode has a low requirement on assembly precision of the first driving assembly, the lifting component, and the like, is easy to implement, and helps reduce costs.

It may be understood that the moving accordingly may be a direct connection relationship, or may be an indirect coupling relationship through another component, provided that when the first driving assembly rotates, the lifting component is driven to move in the first direction toward the outside of the housing.

In a possible implementation, at least a part of the first driving assembly is located outside the housing, that is, at least a part of the first driving assembly is exposed outside the housing. This helps a user manually rotate the first driving assembly to drive the lifting component to move, thereby implementing zoom adjustment and facilitating an operation. In addition, there is no need to dispose a driving component for rotation of the first driving assembly. This helps simplify a structure.

In a possible implementation, the first driving assembly includes a first driving component and a first adjustment component, a first end of the first driving component is disposed on the base and rotatably matches the base, the lifting component is sleeved on an inner side of the first driving component, the first adjustment component is sleeved on an outer side of a second end of the first driving component and is coupled to the first driving component, and at least a part of the first adjustment component is located outside the housing. In this way, a user can manually rotate the first adjustment component, and the first adjustment component can drive the first driving component to rotate relative to the base, so that the lifting component moves in the first direction. The first driving assembly includes the first driving component and the first adjustment component that are independent of each other. This helps increase flexibility in designing structures and dimensions of the first driving component and the first adjustment component, and also facilitates assembly and disposing between the first driving assembly and the base and the housing.

In a possible implementation, the electronic device further includes a second driving component rotatably disposed in the accommodation cavity, where the second driving component is sleeved on an outer side of the first lens assembly and moves accordingly with the first lens assembly, and the second driving component moves accordingly with the first driving assembly. When the first driving assembly rotates relative to the base, the first driving assembly is further configured to drive the second driving component to rotate relative to the base, and the second driving component drives the first lens assembly to move in the first direction. In other words, the first driving assembly rotates relative to the base, and the first driving assembly can drive both the first lens assembly and the lifting component to move in the optical axis direction. To be specific, synchronous driving of movement of the lifting component and the first lens assembly can be implemented by using the first driving assembly. Compared with driving structures respectively disposed to drive the lifting component and the first lens assembly to move, one mechanism structure can implement driving of the movement of the lifting component and the first lens assembly. A structure of a driving mechanism for implementing the movement of the lifting component and the first lens assembly is effectively simplified while a long zoom distance is implemented. This helps reduce costs.

In addition, during assembly of the electronic device, the second driving component and the first lens assembly may be assembled together, that is, the second driving component and the camera module are assembled together, and the first driving assembly, the lifting component, the base, a pressing cover, and the like are assembled together to form an adjustment mechanism. The adjustment mechanism may be assembled together with the rear cover through the pressing cover, and then the second driving component and the first driving assembly are aligned and match each other. In other words, after being separately assembled, the first lens assembly and a driving mechanism thereof, and the lifting component and a driving mechanism thereof are assembled, and decoupling of assembly of the first lens assembly and the driving mechanism thereof and assembly of the lifting component and the driving mechanism thereof is implemented. The lifting component and the driving mechanism thereof are assembled together with the rear cover, and the first lens assembly and the driving mechanism thereof are assembled together with the camera module, provided that the two parts are aligned and assembled when the electronic device is assembled as a whole. This can further reduce a precision requirement during assembly of the electronic device, and better facilitate assembly implementation.

In a possible implementation, the camera module further includes a second lens assembly, and an optical axis of the second lens assembly coincides with an optical axis of the first lens assembly, and the second lens assembly is located on an image side of the first lens assembly; and the second driving component further moves accordingly with the second lens assembly, and when the second driving component rotates relative to the base, the second driving component further drives the second lens assembly to move in the optical axis direction. Disposing of the second lens assembly helps further improve or enrich photographing performance of the camera module. When the first driving assembly rotates relative to the base, the first driving assembly can drive the lifting component to move in the optical axis direction, the first driving assembly can drive the second driving component to rotate relative to the base, and the first lens assembly and the second lens assembly are driven to move in the optical axis direction, so that the lifting component, the first lens assembly, and the second lens assembly can move accordingly.

In other words, synchronous movement of the lifting component, the first lens assembly, and the second lens assembly is driven by using a simple mechanical mechanism. A structure of a driving mechanism is significantly simplified while implementing a good zoom distance. This facilitates implementation and helps reduce costs.

In a possible implementation, the camera module further includes a second lens assembly, and an optical axis of the second lens assembly coincides with an optical axis of the first lens assembly, and the second lens assembly is located on an image side of the first lens assembly.

The electronic device further includes a third driving component and a second driving assembly; the third driving component is rotatably disposed in the accommodation cavity, and the third driving component is sleeved on an outer side of the second lens assembly and moves accordingly with the second lens assembly.

The second driving assembly is disposed around a circumferential direction of the first driving assembly, the second driving assembly rotatably matches the base, and the second driving assembly moves accordingly with the third driving component; and when the second driving assembly rotates relative to the base, the second driving assembly drives the third driving component to rotate relative to the base, and the third driving component drives the second lens assembly to move in the optical axis direction. In other words, the lifting component can be driven through the rotation of the first driving assembly to move, and the second lens assembly can be driven through rotation of the second driving assembly to move, so that the lifting component and the second lens assembly are separately driven to move, a movement driving manner is enriched, and design flexibility of the electronic device is increased.

In a possible implementation, the electronic device further includes a first transmission component, where a first end of the first transmission component is coupled to the first driving assembly, a second end of the first transmission component rotatably matches the base, and the first transmission component is coupled to the second driving component.

When the first driving assembly rotates relative to the base, the first driving assembly can drive the lifting component to move in the optical axis direction, and the first driving assembly can drive the first transmission component to rotate relative to the base. The first transmission component drives the second driving component to rotate relative to the base, so that the second driving component drives the first lens assembly to move in the optical axis direction, thereby implementing synchronous movement of the lifting component and the first lens assembly. The first driving assembly and the second driving assembly can further move accordingly by using the first transmission component while ensuring that the first driving assembly can rotate relative to the base. A structural design is simple, which helps simplify the structure.

In a possible implementation, a sliding rail is disposed in a circumferential direction of the base, a sliding component is disposed on the second end of the first transmission component, and the sliding component is located in the sliding rail and slides along the sliding rail, thereby implementing rotational matching between the first transmission component and the base. The sliding rail is distributed in the circumferential direction of the base, so that the first transmission component can rotate relative to the base for a plurality of circles. This helps increase movable distances of the lifting component and the first lens assembly in the optical axis direction, can increase a size of the expanded avoidance space, and further increase a zoom distance of the first lens assembly.

In a possible implementation, the electronic device further includes an elastic component, where the elastic component is disposed on the first driving assembly, and the elastic component is located between the first end of the first transmission component and the first driving assembly. The elastic component can give the first transmission component an expansion and contraction margin in the optical axis direction, so that a connection between the first transmission component and the second driving component can be implemented while ensuring that the first transmission component rotates relative to the base.

The base includes an inner ring part, a partition part, and an outer ring part, the outer ring part is disposed around an outer side of the inner ring part, a gap is formed between the inner ring part and the outer ring part to form the sliding rail, the inner ring part and the outer ring part are coupled through the partition part, and the partition part divides the sliding rail into a plurality of rail slots.

When the sliding component slides in the rail slot, a part of the sliding component passes through the rail slot and is coupled to the second driving component, to implement a connection between the first transmission component and the second driving component. In this way, when the first transmission component rotates, the second driving component can be driven to rotate, the first driving assembly can drive, by using the first transmission component, the second driving component to rotate, and further drive the first lens assembly to move.

When the sliding component slides along one rail slot to the partition part, the partition part squeezes the sliding component, so that the elastic component is compressed to enable the sliding component to detach the rail slot. The first transmission component is continuously rotated, so that the sliding component can slide through the partition part. When the sliding component slides through the partition part, the elastic component rebounds, so that the sliding component slides into another adjacent rail slot. In this case, the sliding component can continue to be coupled to the second driving component. In this way, the sliding component can sequentially slide in the plurality of rail slots, to ensure that the first transmission component can rotate relative to the base for a plurality of circles, and increase movable distances of the lifting component and the first lens assembly.

In a possible implementation, the partition part includes a first side wall surface and a second side wall surface that are opposite, the sliding component includes a third side wall surface and a fourth side wall surface that are opposite, and when the sliding component slides to the partition part, the first side wall surface presses against the third side wall surface.

The first side wall surface has a first inclined surface, the third side wall surface has a third inclined surface, and along a sliding direction of the sliding component, the first inclined surface and the third inclined surface incline toward a direction close to the elastic component. This helps the partition part squeeze the sliding component and the elastic component, so that the sliding component slides through the partition part and into an adjacent rail slot to continue sliding, thereby improving sliding smoothness of the sliding component.

The second side wall surface has a second inclined surface, the fourth side wall surface has a fourth inclined surface, and inclined directions of the second inclined surface and the fourth inclined surface are the same, and are both opposite to inclined directions of the first inclined surface and the third inclined surface, to ensure smoothness when the sliding component reversely rotates to shrink the lifting component.

In a possible implementation, a position-limiting slot is disposed in the circumferential direction of the first driving assembly, and the first transmission component and the elastic component are located in the position-limiting slot. The position-limiting slot can perform a position-limiting function on the first transmission component and the elastic component. This helps ensure that the first transmission component can expand and contract in the optical axis direction under the action of the elastic component, and ensures smoothness of sequential sliding of the sliding component in the rail slot. In addition, stability of a connection between the first transmission component and the first driving assembly can be further ensured.

In a possible implementation, a position-limiting part is disposed on a bottom wall of the position-limiting slot, the elastic component is disposed in the position-limiting part, and the first transmission component presses against the elastic component. The position-limiting part can perform a position-limiting function on the elastic component, to ensure that the elastic component is compressed or rebounds in the optical axis direction, and ensure that the sliding component can smoothly slide from one rail slot to an adjacent rail slot, thereby further improving sliding smoothness of the sliding component.

In a possible implementation, a first position-limiting component is further disposed on the first driving assembly, a second position-limiting component matching the first position-limiting component is disposed on the first end of the first transmission component, and the first transmission component and the first driving assembly are coupled through matching of the first position-limiting component and the second position-limiting component, so that the first transmission component can be driven through rotation of the first driving assembly to rotate relative to the base.

In a possible implementation, a plurality of third position-limiting components matching the sliding component are disposed on the second driving component, the plurality of third position-limiting components are distributed in a circumferential direction of the second driving component, and the first transmission component and the second driving component are coupled through matching of the sliding component and the third position-limiting component, so that the first transmission component can drive the second driving component to rotate relative to the base.

In a possible implementation, the second driving assembly includes a second adjustment component and a second transmission component, the second adjustment component is located outside the housing, the second adjustment component is disposed around the first adjustment component of the first driving assembly, and the second adjustment component is coupled to the third driving component through the second transmission component. The third driving component can be driven to rotate relative to the base by rotating the second adjustment component, and further, the second lens assembly can be driven to move. This helps implement assembly and disposing of the second driving assembly and the base, the housing, and the like.

In a possible implementation, a first helical rail is disposed on an inner side wall of the first driving assembly, a second helical rail matching the first helical rail is disposed on an outer side wall of the lifting component, and the first driving assembly moves accordingly with the lifting component through matching of the first helical rail and the second helical rail. When the first driving component rotates, the first helical rail rotates relative to the second helical rail, to generate movement in the optical axis direction, thereby driving the lifting component to move in the optical axis direction.

The light transmission component is located on an end surface of a first end of the lifting component, a second end of the lifting component passes through the first driving assembly and extends into the base, a guiding rail is disposed on an inner side wall of the base, the guiding rail extends in the first direction, a guiding component is further disposed on an outer side wall of the second end of the lifting component, and the guiding component can slide along the guiding rail. In this way, through matching of the guiding component and the guiding rail, rotation of the lifting component relative to the base is limited, that is, rotation of the lifting component relative to the housing is limited, so that the lifting component only moves relative to the housing in the optical axis direction.

In a possible implementation, the second driving component is sleeved on an outer side of the first lens assembly, a third helical rail is disposed on an inner side wall of the second driving component, a fourth helical rail matching the third helical rail is disposed on an outer side wall of the first lens assembly, and the second driving component moves accordingly with the first lens assembly through matching of the third helical rail and the fourth helical rail. When the second driving component rotates relative to the housing, the third helical rail rotates relative to the fourth helical rail, to generate movement in the optical axis direction, thereby driving the first lens assembly to move in the optical axis direction.

In a possible implementation, the electronic device further includes a pressing cover, where a convex pressing platform is disposed on an outer side wall of the circumferential direction of the first driving assembly, the pressing cover is sleeved on an outer side of the first driving assembly and presses against the pressing platform, and the pressing cover is pressed on a side that is of the pressing platform and that faces away from the base. The pressing cover is fastened to the base, and the base is fastened to the housing through the pressing cover, so that the first driving component is assembled with the base through the pressing cover. In addition, the lifting component is sleeved on the first driving assembly, so that the base, the lifting component, the first driving assembly, and the like can be assembled with the housing through the pressing cover, thereby implementing the assembly of the components with the housing. When the electronic device is assembled as a whole, before being assembled with the rear cover, the first driving assembly, the base, the pressing cover, and the lifting component can be assembled together first, and then the rear cover is assembled with the camera module. This facilitates assembly implementation and helps reduce a precision requirement for assembly of the electronic device.

In a possible implementation, a first clamping component is disposed on an inner side wall of the first adjustment component, a second clamping component matching the first clamping component is disposed on an outer side wall of a second end of the first driving component, and the first adjustment component and the first driving component are coupled through matching of the first clamping component and the second clamping component. A position-limiting function on the first adjustment component is implemented through the matching of the first clamping component and the second clamping component, to implement a connection between the first adjustment component and the first driving component. When the first adjustment component is rotated, the first adjustment component can drive the first driving component to rotate, to facilitate assembly, replacement, and disassembly.

In a possible implementation, the electronic device further includes an operation and control component movably disposed on the housing, where the operation and control component is located outside the housing, and the operation and control component moves accordingly with the first driving assembly. In this way, driving of movement of the lifting component can be implemented by operating the operation and control component, and a manner of driving the lifting component to move to implement zooming is enriched. This helps improve use experience.

DESCRIPTIONS OF REFERENCE NUMERALS

100: Electronic device;

10: Housing;

11: Rear cover; 111: Avoidance hole; 112: Accommodation cavity;

12: Middle frame;

13: Display;

15: Circuit board;

16: Battery;

20: Adjustment mechanism;

21: Lifting component; 211: Light transmission component; 212: Second helical rail; 213: Guiding component;

22: Base; 221: Sliding rail; 222*a*: Inner ring part; 222*b*: Outer ring part; 223: Partition part; 224: Guiding rail;

23: First driving assembly; 231: First adjustment component; 2311: First clamping component; 232: First driving component; 2321: Position-limiting part; 2322: Position-limiting slot; 2323: First position-limiting component; 2324: First helical rail; 2325: Second clamping component; 2326: Pressing platform;

24: First transmission component; 241: Sliding component; 242: Second position-limiting component;

25: Elastic component;

26: Pressing cover;

27: Second driving assembly; 271: Second adjustment component; 272: Second transmission component;

30: Camera module;

31: First lens assembly; 311: First lens component; 312: First lens support; 3121: Fourth helical rail;

32: Image sensor;

33: Second lens assembly;

40: Second driving component;

41: Third position-limiting component;

42: Third helical rail;

50: Third driving component.

DESCRIPTION OF EMBODIMENTS

Terms used in implementations of this application are merely used to explain specific embodiments of this application, but are not intended to limit this application.

An electronic device provided in embodiments of this application may include but is not limited to an electronic device with a camera module, like a mobile phone, a tablet computer, a notebook computer, an ultra-mobile personal computer (ultra-mobile personal computer, UMPC), a handheld computer, a walkie-talkie, a netbook, a POS terminal, a personal digital assistant (personal digital assistant, PDA), a wearable device, a virtual reality device, or a vehicle-mounted apparatus.

Figure 1:
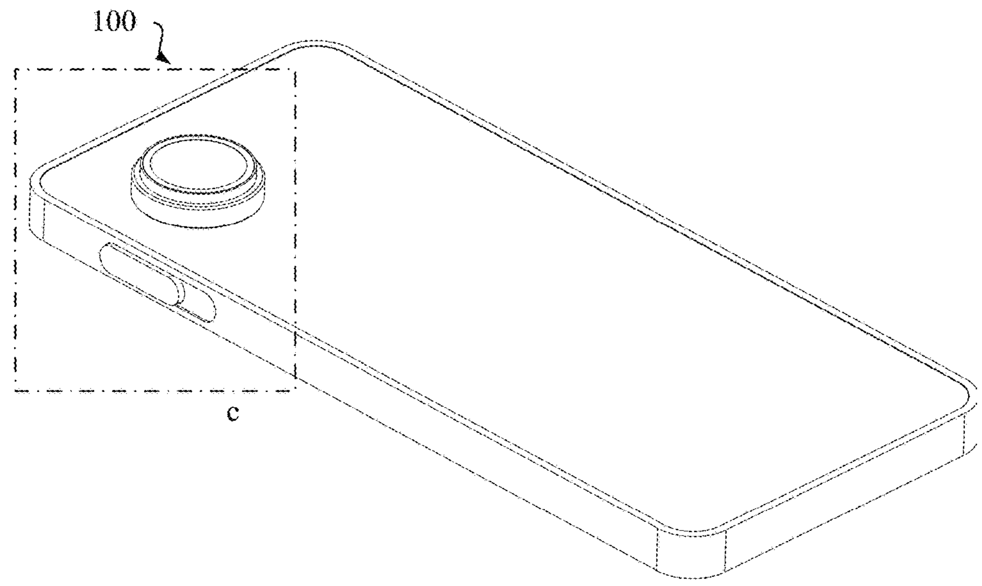
FIG. 1 is a schematic diagram of a structure of an electronic device according to an embodiment of this application.

FIG. 1 is a schematic diagram of a structure of an electronic device according to an embodiment of this application.

In this embodiment of this application, an example in which the electronic device is a mobile phone is used. The mobile phone may be a bar-type mobile phone, or the mobile phone may be a foldable mobile phone. Specifically, refer to FIG. 1. An example in which the electronic device 100 is a bar-type mobile phone is used for description.

Figure 2:
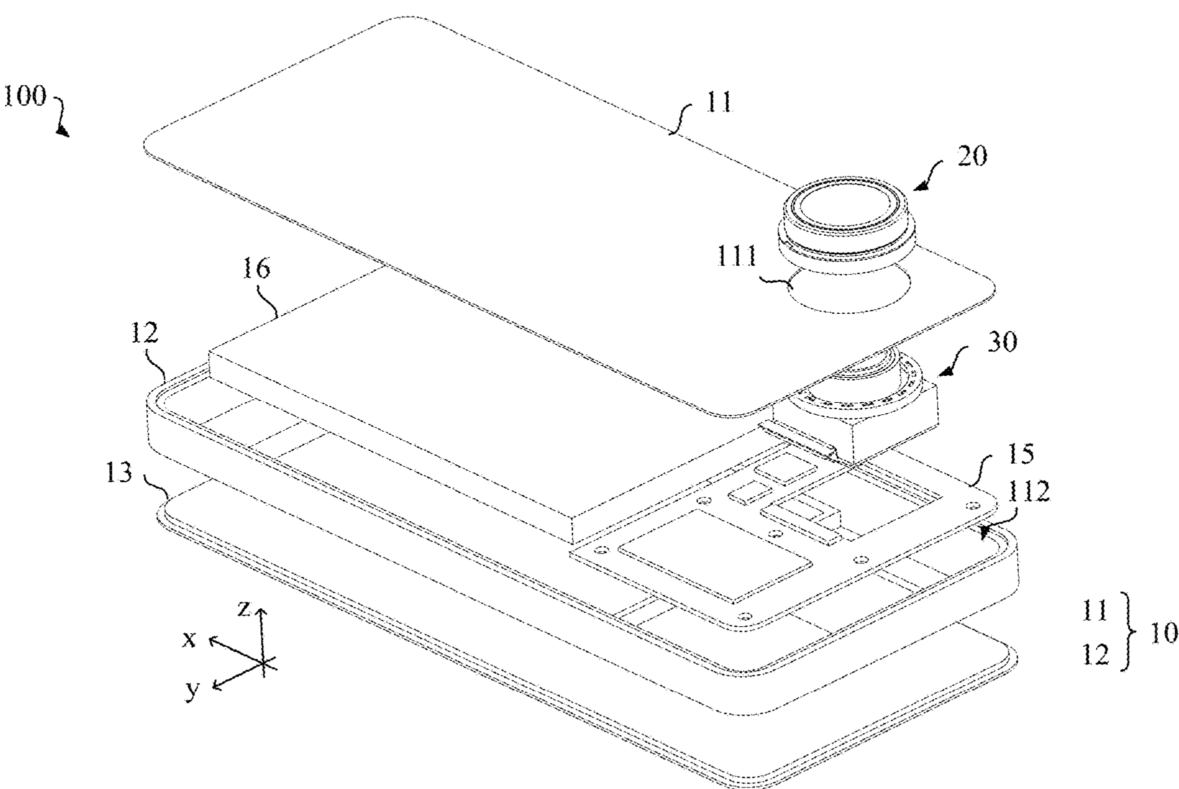
FIG. 2 is a schematic diagram of a partially disassembled structure of an electronic device according to an embodiment of this application.

FIG. 2 is a schematic diagram of a partially disassembled structure of the electronic device according to an embodiment of this application.

Refer to FIG. 2. The electronic device 100 may include a housing 10 and a display 13, and the housing 10 may provide a mounting foundation for another structural component included in the electronic device 100. The display 13 may be disposed on the housing 10 to form a display surface, and the display 13 is configured to display image information and the like.

The housing 10 may have an accommodation cavity 112. Specifically, the housing 10 may include a rear cover 11 and a middle frame 12. The rear cover 11 and the display 13 may be respectively located on two opposite sides of the middle frame 12. The middle frame 12 and the rear cover 11 may jointly enclose the accommodation cavity 112. In this embodiment of this application, a vertical direction from the display 13 to the rear cover 11 is used as a thickness direction of the electronic device 100, for example, a z direction in the figure, a length direction of the display 13 is used as a height direction of the electronic device 100, for example, an x direction in the figure, and a width direction of the display 13 is a width direction of the electronic device 100, for example, a y direction in the figure.

The electronic device 100 may further include a camera module 30. The camera module 30 may be disposed in the accommodation cavity 112 of the housing 10, and the camera module 30 is configured to implement a photographing function. There may be one camera module included in the electronic device 100, or there may be a plurality of camera modules included in the electronic device 100, to meet different photographing requirements.

The electronic device 100 may further include another structural component accommodated in the accommodation cavity 112. For example, refer to FIG. 2. The electronic device 100 may further include a battery 16 and a circuit board 15. The battery 16 may be configured to supply power to the electronic device 100, and the circuit board 15 may be configured to control the entire electronic device 100. The circuit board 15 may be a printed circuit board (Printed Circuit Board, PCB for short), and an electronic component like a central processing unit (Central Processing Unit, CPU for short) or a power management chip (Power Management IC, PMIC for short) may be disposed on the circuit board.

The housing 10 of the electronic device 100 may also have another structure, to enrich or complete functions of the electronic device 100. For example, a speaker may be disposed on the housing 10, to implement playing of an audio or the like of the electronic device 100. A data interface may be further disposed on the housing 10, and is configured to supply power to the electronic device 100, or may be configured to connect the electronic device 100 to a headset, an external multimedia device, and the like (for example, an external camera, and an external projection device).

Certainly, in some other examples, the electronic device 100 may further include another structural component, for example, a sensor, a communication module, or an inductor. This is not limited in embodiments of this application.

Still refer to FIG. 2. An avoidance hole 111 may be disposed on the housing 10. Specifically, the avoidance hole 111 may be disposed on the rear cover 11, and the avoidance hole 111 penetrates the rear cover 11, so that the avoidance hole 111 communicates with the accommodation cavity 112 of the housing 10. In this way, an external environment of the housing 10 communicates with the accommodation cavity 112 through the avoidance hole 111, and the avoidance hole 111 may be opposite to a light incident surface of the camera module 30, so that light can enter the camera module 30 through the avoidance hole 111.

Figure 3:
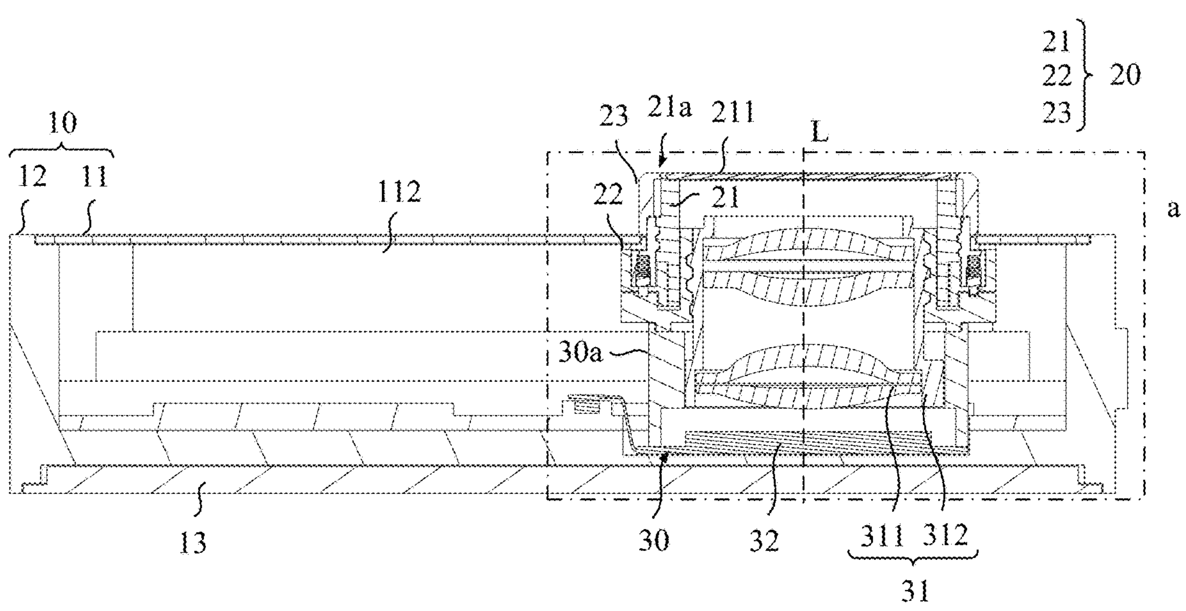
FIG. 3 is a schematic diagram of a sectional structure in which a lifting component of an electronic device is in a first position according to an embodiment of this application.

FIG. 3 is a schematic diagram of a sectional structure in which a lifting component of the electronic device is in a first position according to an embodiment of this application. That the lifting component is in the first position in this application may be understood as that the lifting component is in a starting position close to the housing 10. Certainly, it may be understood that the first position may alternatively be a position between a starting position and a remote position, provided that the lifting component may further move in a direction away from the housing 10 by using a first driving assembly.

Refer to FIG. 3. The camera module 30 may include an outer housing 30*a*. The outer housing 30*a* serves as a structural foundation for the camera module 30 and is configured to carry another structural component of the camera module 30. The camera module 30 may be disposed in the accommodation cavity 112 through the outer housing 30*a*.

The camera module 30 may further include a first lens assembly 31 and an image sensor 32. Both the first lens assembly 31 and the image sensor 32 are disposed on the outer housing. The first lens assembly 31 may include a first lens support 312 and a first lens component 311 disposed in the first lens support 312. There may be one first lens component 311, or there may be a plurality of first lens components 311. That the first lens assembly 31 includes the plurality of lens components 311 is used as an example. The plurality of first lens components 311 may be sequentially arranged in an optical axis direction, and an optical axis of the lens assembly is light (L in FIG. 3) passing through centers of the lens components in the lens assembly. The optical axis direction of the first lens assembly 31 may be consistent with the thickness direction of the electronic device 100, and a sensing surface of the image sensor 32 is disposed opposite to the first lens assembly 31.

With the first lens assembly as a boundary, a side on which a photographed object is located is an object side, correspondingly, a side on which an image of the photographed object is located is an image side, and an incident surface of the first lens component closest to the photographed object in the first lens assembly 31 may be used as the light incident surface of the camera module 30. Light reflected by the photographed object may enter the first lens assembly 31 through the light incident surface. After the light passes through the first lens assembly 31 to adjust and control an optical path, a light image is generated, and the light image is irradiated to a photosensitive surface of the image sensor 32. The image sensor 32 can implement an optical-to-electrical conversion function to convert the received light image into an electrical signal for imaging display.

To implement a zoom function of the camera module 30, the first lens assembly 31 is movably disposed on the outer housing 30*a*. Specifically, the first lens assembly 31 may move relative to the outer housing 30*a* in the optical axis direction, so that the first lens assembly 31 can move relative to the image sensor 32. Movement of the first lens assembly 31 changes a distance between the first lens assembly 31 and the image sensor 32, to change an image distance to implement zooming and improve photographing effect of the camera module 30.

The electronic device 100 further includes an adjustment mechanism 20 (as shown in FIG. 2). A moving distance of the first lens assembly in the optical axis direction is used as a zoom distance, and the adjustment mechanism 20 is configured to increase the zoom distance of the first lens assembly 31. Specifically, still refer to FIG. 3. The adjustment mechanism 20 may include a lifting component 21, a light transmission component 211 is disposed on a first end 21*a* of the lifting component 21, and the light transmission component 211 is located on a side that is of the first lens assembly 31 and that faces the object side. In other words, the first lens assembly 31 is located between the light transmission component 211 and the image sensor 32, and a space between the light transmission component 211 and the image sensor 32 is a movable space for implementing zooming by the first lens assembly. The light transmission component 211 may be disposed opposite to the avoidance hole 111, and the light transmission component 211 can shield the avoidance hole 111, to protect the structural components such as the first lens assembly and the image sensor 32 in the accommodation cavity 112.

The light transmission component 211 may be a glass lens, or the light transmission component 211 may be another structural component that can transmit light, for example, a plastic lens.

To increase a zoom distance length, the lifting component 21 may be disposed in a movable manner. Specifically, refer to FIG. 3. The adjustment mechanism 20 may further include a base 22 and a first driving assembly 23. The base 22 may be located in the accommodation cavity 112, the base 22 may be fastened to the rear cover 11 of the housing 10, and the base 22 is configured to carry structures such as the lifting component 21 and the first driving assembly 23. The first driving assembly 23 may be disposed on the base 22, the first driving assembly 23 may rotatably match the base 22, and the first driving assembly 23 may rotate relative to the base 22 and the housing 10.

The lifting component 21 may be sleeved on the first driving assembly 23, for example, the lifting component 21 may be sleeved on an inner side of the first driving assembly 23. The lifting component 21 moves accordingly with the first driving assembly 23. For example, the lifting component 21 and the first driving assembly 23 may match each other by using a rail structure or the like, so that when the first driving assembly 23 rotates relative to the housing 10, the lifting component 21 can be driven to move relative to the base 22 and the housing 10 in a direction parallel to the optical axis of the first lens assembly.

Figure 4:
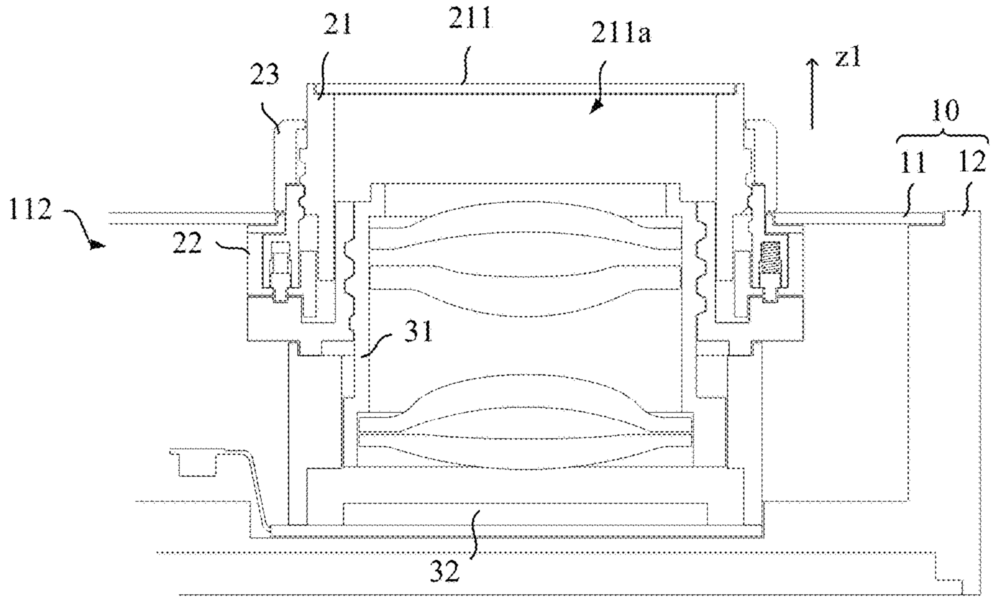
FIG. 4 is an enlarged schematic diagram of a partially sectional structure in which a lifting component of an electronic device is in a second position according to an embodiment of this application.

FIG. 4 is an enlarged schematic diagram of a partially sectional structure in which the lifting component of the electronic device is in a second position according to an embodiment of this application. That the lifting component is in the second position in this application may be understood as that the lifting component is in a remote position away from the housing 10. Certainly, it may be understood that the second position may alternatively be the position between the starting position and the remote position, provided that the lifting component may further move in a direction toward the housing 10 by using the first driving assembly.

Refer to FIG. 4. When the lifting component 21 is in the second position, the first driving assembly 23 may rotate relative to the base 22, and the first driving assembly 23 can drive the lifting component 21 to move in a first direction toward the outside of the housing 10. The first direction is parallel to the optical axis direction, for example, a z1 direction in the figure. Movement of the lifting component 21 drives the light transmission component 211 on the lifting component 21 to move away from the image sensor 32, increases a distance between the light transmission component 211 and the image sensor 32, releases a larger space between the light transmission component 211 and the image sensor 32, the released space forms an avoidance space 211*a*, and the first lens assembly 31 can move in the avoidance space 211*a*. In this way, the movable space of the first lens assembly 31 is expanded, so that the first lens assembly 31 has a larger moving space to achieve zoom effect, and the zoom distance of the first lens assembly 31 is significantly increased, to meet the photographing requirement of the electronic device.

Figure 7:
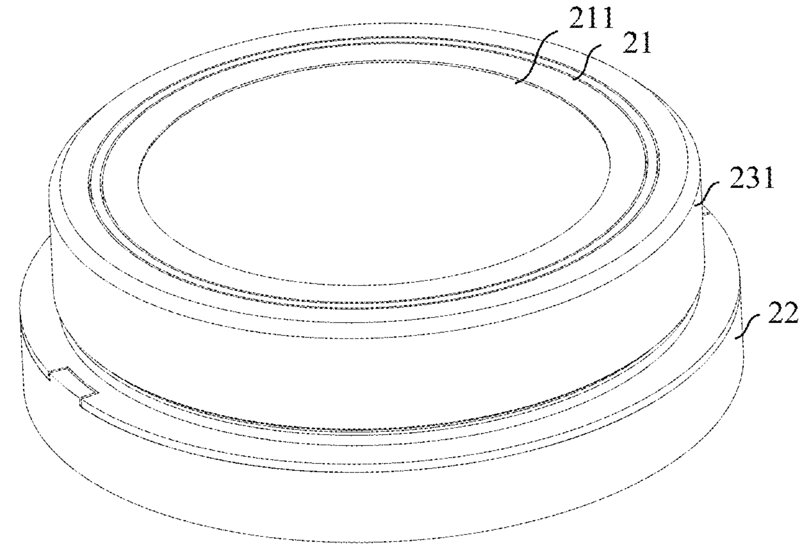
FIG. 7 is a schematic diagram of a structure of an adjustment mechanism of an electronic device according to an embodiment of this application.

It should be noted that the base and the first driving assembly are of hollow structures, to vacate a specific space to facilitate the movement of the first lens assembly. For example, the base and the first driving assembly may be of ring-shaped structures (as shown in FIG. 7). Specifically, the base and the first driving assembly may be of regular ring-shaped structures such as a circular ring, an elliptical ring, or a square ring. Certainly, in some other examples, the base, the first driving assembly, and the like may alternatively be of other irregular ring-shaped structures.

Figure 5:
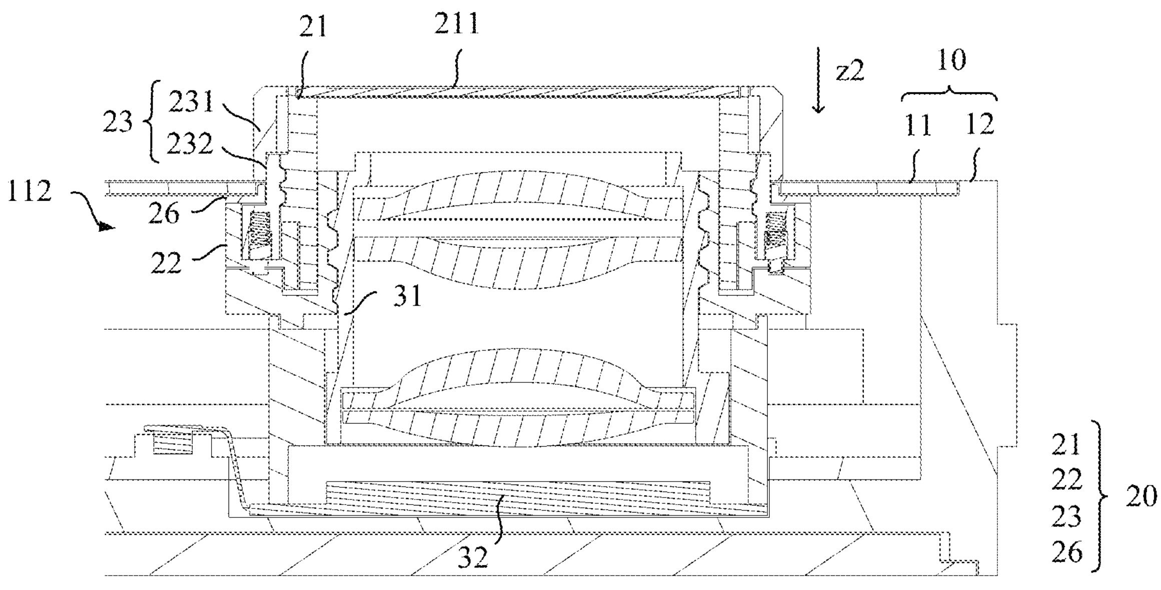
FIG. 5 is a partially enlarged schematic diagram of a part a in FIG. 3.

FIG. 5 is a partially enlarged schematic diagram of a part a in FIG. 3.

When the lifting component 21 is in the second position, the first driving assembly 23 may be reversely rotated, so that the first driving assembly 23 can drive the lifting component 21 to move in a direction opposite to the first direction toward the inside of the housing 10, for example, an z2 direction in the figure, and the lifting component 21 and the light transmission component 211 on the lifting component 21 can return to a starting position shown in FIG. 5. The distance between the light transmission component 211 and the image sensor 32 is compressed, so that a space occupied by the camera module 30 and the lifting component 21 in the optical axis direction is reduced. Therefore, impact on a thickness of the electronic device is reduced or eliminated, which facilitates a thinning design of the electronic device.

In other words, according to the electronic device provided in this embodiment of this application, by rotating the first driving assembly 23, the lifting component 21 can move toward the outside of the housing 10, to release the avoidance space. In this way, the first lens assembly moves to implement zooming, the released space effectively increases the zoom distance of the first lens assembly, and ensures that the camera module 30 has good zoom effect. In addition, the first driving assembly 23 can also drive the lifting component 21 to move toward the inside of the housing 10, to compress and eliminate the avoidance space and reduce an overall occupied space, thereby reducing or avoiding impact of implementation of a long zoom distance on the thickness of the electronic device. The long zoom distance of the first lens assembly can be implemented, photographing requirements such as a long focus length and a wide angle can be met, and good photographing effect can be achieved while ensuring that the electronic device can meet a light and thin experience requirement of a user.

In addition, the first driving assembly 23 matches the lifting component 21 to implement mechanical driving of the movement of the lifting component 21. Compared with driving of the lifting component 21 in an electric control manner in the conventional technology, a structure of the first driving assembly 23 is simple, and a structure of a driving mechanism for implementing the movement of the lifting component 21 is simplified. In addition, the mechanical driving mode has a low requirement on assembly precision of the first driving assembly 23, the lifting component 21, and the like, is easy to implement, and helps reduce costs.

It should be noted that, when the lifting component 21 is in the second position, the lifting component 21 may retract into the accommodation cavity 112 of the housing 10, the light transmission component 211 may pass through the avoidance hole 111, and the light transmission component 211 may be located on a same plane as the rear cover 11. Alternatively, refer to FIG. 5. The lifting component 21 may alternatively pass through the avoidance hole 111, that is, a part of the lifting component 21 is disposed protruding from the housing 10, a part of the lifting component 21 extends into the accommodation cavity 112, and a part of the lifting component 21 is located outside the housing 10. Certainly, in some examples, the lifting component 21 may alternatively be entirely located outside the housing 10.

The first driving assembly 23 may be located inside the housing 10. Alternatively, the first driving assembly 23 may pass through the avoidance hole 111, a part of the first driving assembly 23 may extend into the accommodation cavity 112 and be disposed on the base 22, and a part of the first driving assembly 23 may be located outside the housing 10. Alternatively, the first driving assembly 23 may be entirely located outside the housing 10.

When at least a part of the first driving assembly 23 is located outside the housing 10, refer to FIG. 5. In other words, at least a part of the first driving assembly 23 is exposed outside the housing 10. This helps the user manually rotate the first driving assembly 23 to drive the lifting component 21 to move, thereby implementing zoom adjustment and facilitating an operation. In addition, there is no need to dispose a driving component for rotation of the first driving assembly 23. This helps simplify the structure.

The first driving assembly 23 may be an overall structural component. Alternatively, still refer to FIG. 5. The first driving assembly 23 may include a first driving component 232 and a first adjustment component 231. In other words, the first driving assembly 23 may be formed by assembling the first driving component 232 and the first adjustment component 231 that are separately formed. This increases diversity of a manner of assembling the first driving assembly 23 with the housing 10 and the base 22, so that structures, dimensions, and the like of the first adjustment component 231 and the first driving component 232 are slightly affected by an assembly requirement of the avoidance hole on the housing 10. This helps increase flexibility in designing the structures and the dimensions of the first driving component 232 and the first adjustment component 231, and also facilitates assembly and disposing between the first driving assembly 23 and the base 22 and the housing 10.

The first driving component 232 may be disposed on the base 22, and the first driving component 232 rotatably matches the base 22, to implement rotational matching of the first driving assembly 23 and the base 22. The lifting component 21 may be sleeved on an inner side of the first driving component 232, so that the lifting component 21 and the first driving assembly 23 can move accordingly. At least a part of the first adjustment component 231 may be located outside the housing 10, and the first adjustment component 231 may be sleeved on an outer side of the first driving component 232 and be coupled to the first driving component 232. In this way, the user can manually rotate the first adjustment component 231, and the first adjustment component 231 can drive the first driving component 232 to rotate, so that the lifting component 21 moves in the first direction. This facilitates the operation.

The first adjustment component 231 may pass through the avoidance hole 111, a part of the first adjustment component 231 may extend into the accommodation cavity 112, and a part of the first adjustment component 231 may be located outside the housing 10. Alternatively, the first adjustment component 231 may be entirely located outside the housing 10.

When the first adjustment component 231 is entirely located outside the housing 10, the first driving component 232 may pass through the avoidance hole 111, a part of the first driving component 232 extends into the accommodation cavity 112, and a part of the first driving component 232 is located outside the housing 10. The first adjustment component 231 is sleeved on an outer side of the part of the first driving component 232 located outside the housing 10. An outer diameter of the first adjustment component 231 may be greater than an inner diameter of the avoidance hole, and the first adjustment component 231 can further shield the avoidance hole.

Figure 6:
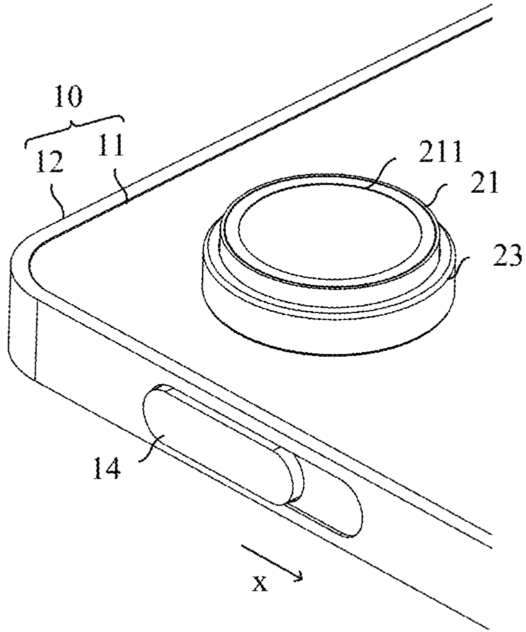
FIG. 6 is a partially enlarged schematic diagram of a part c in FIG. 1.

FIG. 6 is a partially enlarged schematic diagram of a part c in FIG. 1.

Certainly, in some examples, driving of the movement of the lifting component 21 may alternatively be implemented in another operation manner. For example, refer to FIG. 6. An operation and control component 14 may be disposed on the electronic device 100, and the operation and control component 14 may move accordingly with the first driving assembly 23. Specifically, the operation and control component 14 may move accordingly with the first adjustment component 231, or the operation and control component 14 may move accordingly with the first driving component 232.

The operation and control component 14 may be disposed on the housing 10 in a movable manner. When moving relative to the housing 10, the operation and control component 14 can drive the first driving assembly 23 to rotate, and then the first driving assembly 23 drives the lifting component 21 to move in the first direction. In this way, the lifting component 21 can be driven to move by operating the operation and control component 14, and a manner of driving the lifting component to move is enriched. This helps improve use experience.

There may be a plurality of manners of movably disposing the operation and control component 14, and the operation and control component 14 may be movably disposed relative to the housing 10. For example, the operation and control component 14 may move in a length direction (the x direction in the figure) of the electronic device 100. When the zoom adjustment is implemented by using the camera module 30, the operation and control component 14 may be pushed to move relative to the housing 10, and the operation and control component 14 drives the first driving assembly 23 to rotate, so that the lifting component 21 moves. Alternatively, the operation and control component 14 may be slidably disposed on the housing 10, the operation and control component 14 may be rotatably disposed on the housing 10, or the like.

There may be a plurality of manners in which the operation and control component 14 moves accordingly with the first driving assembly 23, provided that transmission between the operation and control component 14 and the first driving assembly 23 can be implemented. For example, the operation and control component 14 and the first driving assembly 23 may be coupled in an electric driving manner. Alternatively, the operation and control component 14 and the first driving assembly 23 may move accordingly by using a mechanical structure like gear transmission and connecting rod transmission.

The operation and control component 14 may be disposed on the middle frame 12, so that the user touches the operation and control component during photographing, and further, the operation and control component drives the first driving assembly 23 to rotate.

Figure 8:
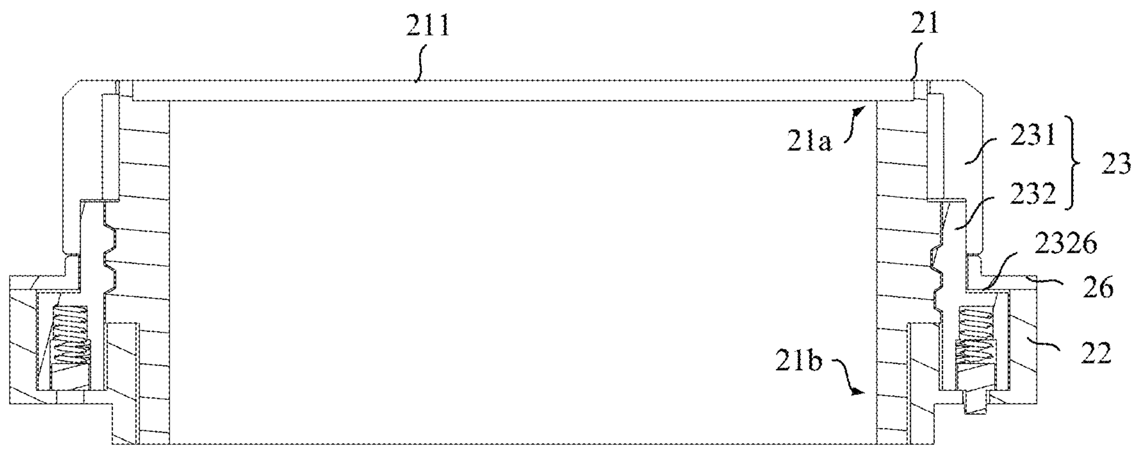
FIG. 8 is a schematic diagram of a sectional structure of an adjustment mechanism of an electronic device according to an embodiment of this application.
Figure 9:
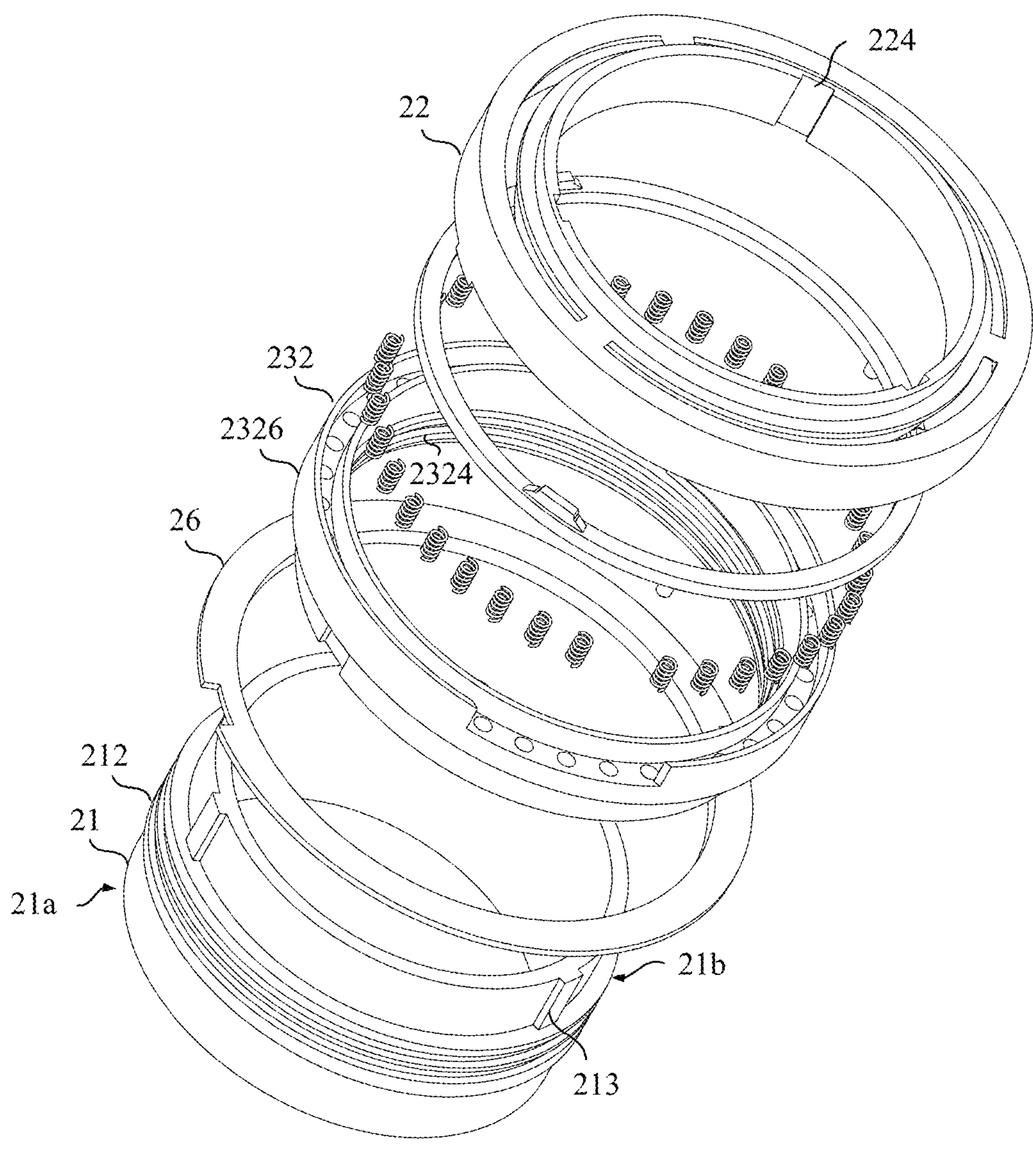
FIG. 9 is a schematic diagram of a partially disassembled structure of an adjustment mechanism of an electronic device according to an embodiment of this application.

FIG. 7 is a schematic diagram of a structure of the adjustment mechanism of the electronic device according to an embodiment of this application, FIG. 8 is a schematic diagram of a sectional structure of the adjustment mechanism of the electronic device according to an embodiment of this application, and FIG. 9 is a schematic diagram of a partially disassembled structure of the adjustment mechanism of the electronic device according to an embodiment of this application.

Refer to FIG. 7. Circular ring-shaped structures such as the base 22, the lifting component 21, the first driving component (not shown in the figure), and the first adjustment component 231 are used as an example to describe a manner in which the first driving assembly 23 moves accordingly with the lifting component 21.

Refer to FIG. 8. A first end of the first driving component 232 may be disposed on the base 22. For example, the first driving component 232 may be sleeved on an inner side of the base 22, and the lifting component 21 may be sleeved on the inner side of the first driving component 232. With reference to FIG. 9, a first helical rail 2324 is disposed on an inner side wall of the first driving component 232, a second helical rail 212 may be disposed on an outer side wall of the lifting component 21, and the first helical rail 2324 matches the second helical rail 212. For example, the first helical rail 2324 may be of a helical groove structure, the second helical rail 212 may be a helical convex structure, and the convex structure may move along the groove structure to implement the matching.

In this way, the first driving component 232 and the lifting component 21 can move accordingly through the matching of the first helical rail 2324 and the second helical rail 212, so that the first driving assembly 23 and the lifting component 21 can move accordingly. When the first driving component 232 rotates, the first helical rail 2324 rotates relative to the second helical rail 212, to generate movement in the optical axis direction, thereby driving the lifting component 21 to move in the optical axis direction.

It should be understood that a moving distance of the lifting component 21 in the optical axis direction can be adjusted by a quantity of helically encircling circles of the first helical rail 2324 and the second helical rail 212.

To ensure that the lifting component 21 does not rotate but only moves in the optical axis direction, a second end 21*b* of the lifting component 21 may pass through the first driving component 232 and extend into the base 22 (as shown in FIG. 8). Still refer to FIG. 9. A guiding rail 224 may be disposed on an inner side wall of the base 22, and the guiding rail 224 may extend in the first direction. A guiding component 213 is disposed on an outer side wall of the second end 21*b* of the lifting component 21, and the guiding component 213 may match the guiding rail 224. For example, the guiding rail 224 may be of a groove structure formed on the inner side wall of the base 22, and the guiding component 213 may be of a convex structure formed on the outer side wall of the lifting component 21. The guiding component 213 may be disposed in the guiding rail 224 and slide in an extension direction of the guiding rail 224. In this way, through the matching of the guiding component 213 and the guiding rail 224, rotation of the lifting component 21 relative to the base 22 is limited, that is, rotation of the lifting component 21 relative to the housing 10 is limited, so that the lifting component 21 only moves relative to the housing 10 in the optical axis direction.

Still refer to FIG. 9. The adjustment mechanism 20 may further include a pressing cover 26, and a convex pressing platform 2326 may be disposed on an outer side wall of a circumferential direction the first driving component 232. With reference to FIG. 8, the pressing cover 26 may be sleeved on the first driving component 232. Specifically, the pressing cover 26 is sleeved on the outer side of the first driving component 232 and presses against the pressing platform 2326, and the pressing cover 26 is pressed on a side that is of the pressing platform 2326 and that faces away from the base 22. The pressing cover 26 may be fastened to the base 22, so that the first driving component 232 is assembled with the base 22 through the pressing cover 26. The pressing cover 26 may limit a position of the first driving assembly 23 in the optical axis direction, so that the first driving assembly 23 can only circumferentially rotate relative to the base 22. In addition, the lifting component 21 is sleeved on the first driving assembly 23, so that the lifting component 21 is assembled with the base 22 through the pressing cover 26.

When the base 22 is disposed in the accommodation cavity 112, the pressing cover 26 is fastened to the housing 10. Specifically, a side that is of the pressing cover 26 and that faces away from the base 22 may be coupled to the housing 10 (as shown in FIG. 5), and a connection manner may be bonding, welding, clamping, or the like. In this way, assembly of the base 22 and the housing 10 is implemented through the pressing cover 26, so that structural components such as the first driving assembly 23 and the lifting component 21 that are disposed on the base 22 are assembled with the housing 10, thereby ensuring stability of an entire structure.

In other words, when the electronic device is assembled, the first driving assembly 23, the base 22, the pressing cover 26, and the lifting component 21 may be assembled first to form the adjustment mechanism 20 (as shown in FIG. 5), and then the adjustment mechanism 20 may be disposed on the rear cover 11 through the pressing cover 26.

Alternatively, when the first driving assembly 23 is formed by the first driving component 232 and the first adjustment component 231 that are separately formed, in a possible implementation, the first driving component 232, the base 22, the lifting component 21, and the pressing cover 26 may be assembled first to form an entire structural component. Then, the structural component is disposed on the rear cover 11, so that a part of the first driving component 232 extends out of the housing 10. Then, the first adjustment component 231 is sleeved on the outer side of the first driving component 232 to form the adjustment mechanism 20, and the adjustment mechanism 20 is disposed on the rear cover 11.

In other words, the adjustment mechanism 20 may be assembled together with the rear cover 11 first, and then the adjustment mechanism 20 and the rear cover 11 match the camera module 30 and the like, to complete overall assembly of the electronic device 100. Compared with separate assembly of the rear cover 11, the camera module 30, the lifting component 21, the driving mechanism of the lifting component 21, and the like, this helps reduce a precision requirement during assembly of the electronic device 100, and facilitate assembly implementation.

It should be noted that, for example, a part of the first driving assembly 23 is located outside the housing 10, and when the adjustment mechanism 20 is assembled to the rear cover 11 of the housing 10, a side that is of the rear cover 11 and that faces the display 13 is an inner side, and a side that is of the rear cover 11 and that faces away from the display 13 is an outer side. The adjustment mechanism 20 may pass through the avoidance hole 111 from the outer side of the rear cover 11 (as shown in FIG. 3), so that the base 22 and the pressing cover 26 extend into the accommodation cavity 112, and the pressing cover 26 is fastened to the rear cover 11 to implement assembly of the adjustment mechanism 20. Certainly, in some examples, the adjustment mechanism 20 may alternatively pass through the avoidance hole 111 from the inner side of the rear cover 11, and then the adjustment mechanism 20 is fastened to the rear cover 11 to implement assembly.

Correspondingly, when the first driving assembly 23 is formed by the first driving component 232 and the first adjustment component 231 that are separately formed, the first driving component 232, the base 22, the lifting component 21, and the pressing cover 26 may be assembled first to form the entire structural component. Then, the structural component is disposed on the rear cover 11, and the first adjustment component 231 is coupled to the first driving component 232 to implement the assembly. Specifically, the structural component may also pass through the avoidance hole 111 from the outer side of the rear cover 11, or the structural component may alternatively pass through the avoidance hole 111 from the inner side of the rear cover 11 to implement the assembly.

Figure 10:
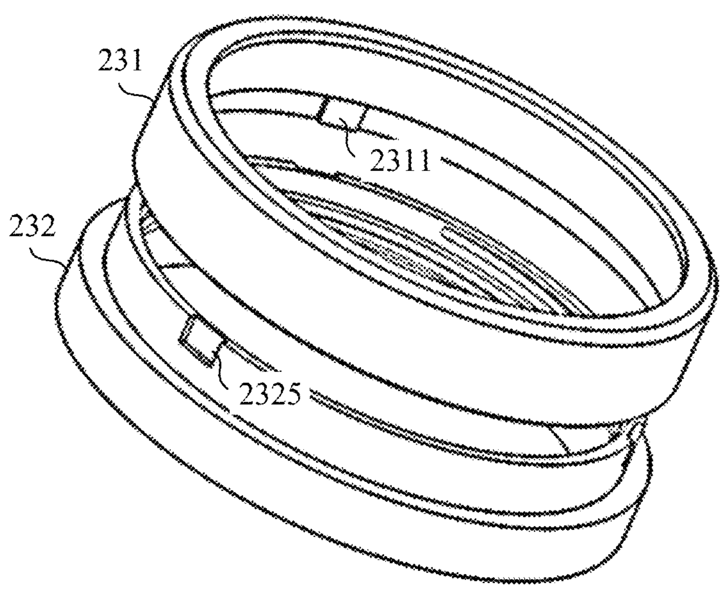
FIG. 10 is a schematic diagram of a disassembled structure of a first driving component and a first adjustment component of an electronic device according to an embodiment of this application.

FIG. 10 is a schematic diagram of a disassembled structure of the first driving component and the first adjustment component of the electronic device according to an embodiment of this application.

When the first driving component 232 and the first adjustment component 231 are separately formed and assembled into the first driving assembly 23, the first adjustment component 231 and the first driving component 232 may be coupled in a plurality of manners. For example, the first adjustment component 231 and the first driving component 232 may be coupled through clamping or bonding or by using a fastening component like a screw.

Specifically, refer to FIG. 10. A first clamping component 2311 may be disposed on an inner side wall of the first adjustment component 231, and a second clamping component 2325 may be disposed on an outer side wall of the first driving component 232. The first clamping component 2311 and the second clamping component 2325 may be clamped and match each other. For example, the first clamping component 2311 may be a clamping slot located on the inner side wall of the first adjustment component 231, the second clamping component 2325 may be a clamping component that is formed by protruding on an outer side wall of the second adjustment component 271, and the second clamping component 2325 may be disposed in the first clamping component 2311. A position-limiting function on the first adjustment component 231 is implemented through the matching of the first clamping component 2311 and the second clamping component 2325, to implement the connection between the first adjustment component 231 and the first driving component 232. When the first adjustment component 231 is rotated, the first adjustment component 231 can drive the first driving component 232 to rotate. Assembly of the first adjustment component 231 and the first driving component 232 is implemented in a clamping manner, which facilitates assembly, replacement, and disassembly.

To ensure firmness of the connection between the first adjustment component 231 and the first driving component 232, after the first clamping component 2311 and the second clamping component 2325 are clamped and match each other, the first clamping component 2311 and the second clamping component 2325 may alternatively be firmly coupled in a bonding manner.

In this embodiment of this application, the lifting component 21 and the first lens assembly 31 may separately move. For example, a first driving structure may be disposed in the electronic device, and the first driving structure may be a zoom motor or the like. The first driving structure is coupled to the first lens assembly 31, to implement movement of the first lens assembly 31 along the optical axis. The first driving assembly 23 drives the lifting component 21 to move in the optical axis direction. The first lens assembly 31 and the lifting component 21 are separately driven by using different driving mechanisms.

Alternatively, the lifting component 21 and the first lens assembly 31 may move accordingly. For example, the first driving assembly 23 can synchronously drive the lifting component 21 and the first lens assembly 31 to move.

Figure 11:
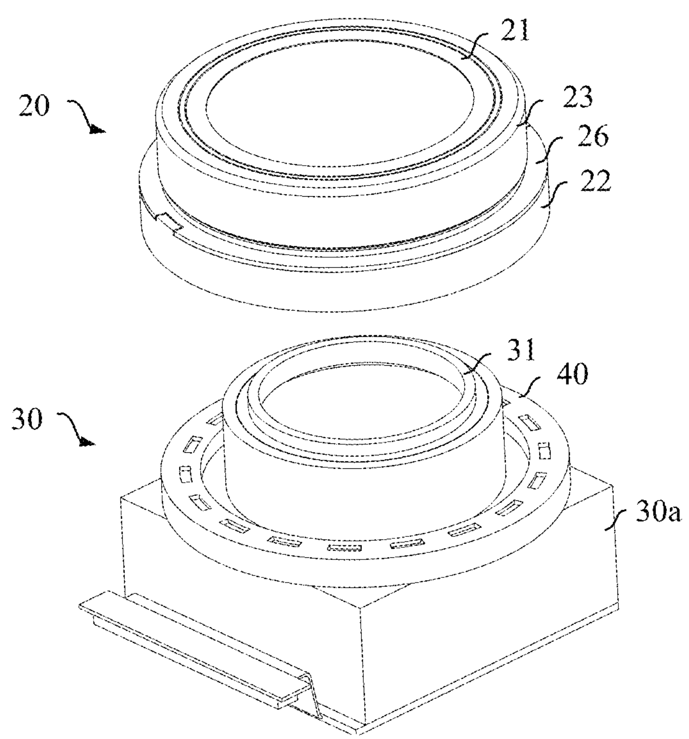
FIG. 11 is a schematic diagram of a partially disassembled structure of a camera module and an adjustment mechanism of an electronic device according to an embodiment of this application.
Figure 12:
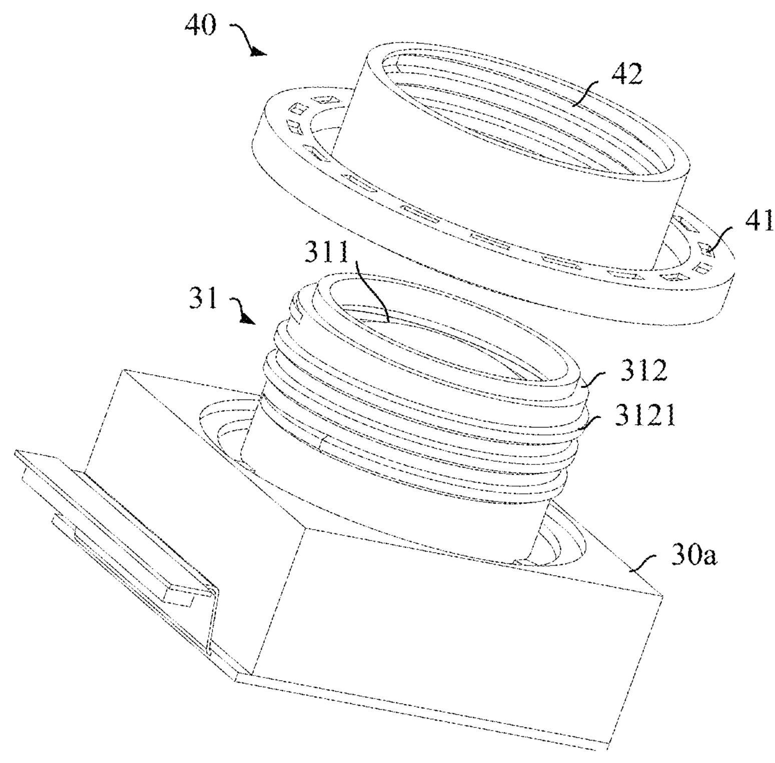
FIG. 12 is an exploded schematic diagram of a second driving component and a camera module of an electronic device according to an embodiment of this application.

FIG. 11 is a schematic diagram of a partially disassembled structure of the camera module and the adjustment mechanism of the electronic device according to an embodiment of this application, and FIG. 12 is an exploded schematic diagram of a second driving component and the camera module of the electronic device according to an embodiment of this application.

Specifically, refer to FIG. 11. The electronic device 100 may further include a second driving component 40. The second driving component 40 may be sleeved on the first lens assembly 31, and specifically, may be sleeved on an outer side of the first lens support 312 of the first lens assembly 31 (as shown in FIG. 12). The second driving component 40 may be rotatably disposed on the outer housing **30*a* of the camera module 30, so that the second driving component 40 can rotate relative to the base 22 and the housing 10**.

The second driving component 40 moves accordingly with the first lens assembly 31. For example, the second driving component 40 and the first lens assembly 31 may match each other by using a rail structure or the like, so that when second driving component 40 rotates relative to the base 22 and the housing 10, the first lens assembly 31 can be driven to move relative to the base 22 and the housing 10 in the optical axis.

Specifically, refer to FIG. 12. A third helical rail 42 may be formed on an inner side wall of the second driving component 40, a fourth helical rail 3121 may be formed on an outer side wall of the first lens support 312 of the first lens assembly 31, and the third helical rail 42 matches the fourth helical rail 3121. For example, the third helical rail 42 may be of a helical groove structure, the fourth helical rail 3121 may be of a helical convex structure, and the convex structure may move along the groove structure to implement the matching.

In this way, the second driving component 40 moves accordingly with the first lens assembly 31 through the matching of the third helical rail 42 and the fourth helical rail 3121. When the second driving component 40 rotates relative to the housing 10 (as shown in FIG. 13), the third helical rail 42 rotates relative to the fourth helical rail 3121, to generate movement in the optical axis direction, thereby driving the first lens assembly 31 to move in the optical axis direction.

It should be understood that a moving distance of the first lens assembly 31 in the optical axis direction can be adjusted by a quantity of helically encircling circles of the third helical rail 42 and the fourth helical rail 3121.

Figure 13:
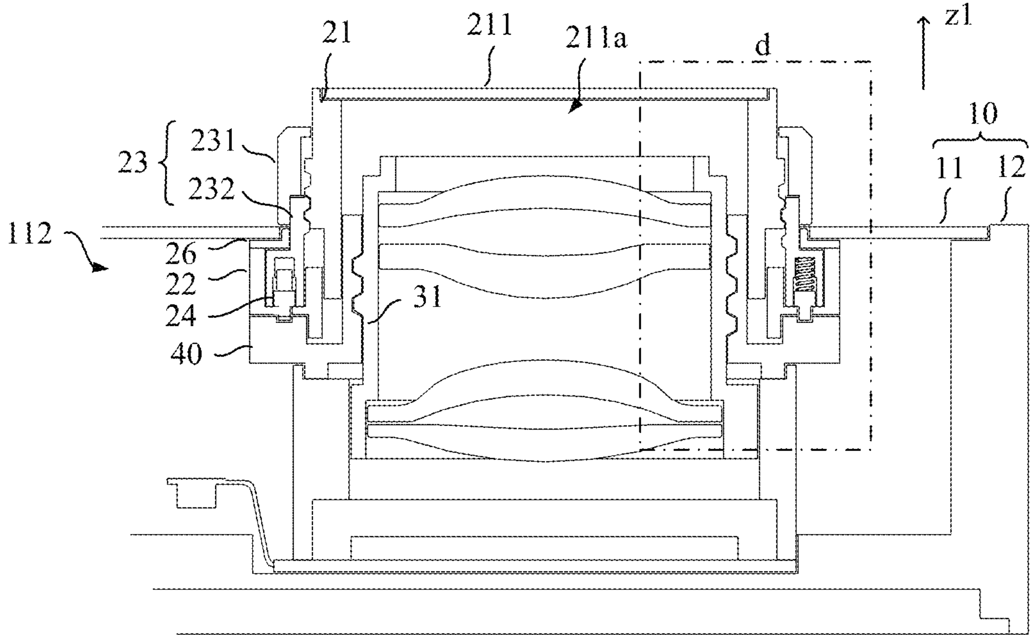
FIG. 13 is an enlarged schematic diagram of a partially sectional structure of an electronic device according to an embodiment of this application.

FIG. 13 is an enlarged schematic diagram of another partially sectional structure of the electronic device according to an embodiment of this application.

Refer to FIG. 13. The second driving component 40 may move accordingly with the first driving assembly 23, so that the second driving component 40 is driven through the rotation of the first driving assembly 23 to rotate.

When the lifting component 21 is in the first position, the first driving assembly 23 rotates relative to the base 22, and the first driving assembly 23 can drive the lifting component 21 to move in the first direction (the z1 direction) toward the outside of the housing 10. The second driving component 40 is also driven through the rotation of the first driving assembly 23 to rotate relative to the housing 10, and the second driving component 40 can drive the first lens assembly 31 to move relative to the housing 10 in the first direction. In this way, the distance between the first lens assembly 31 and the image sensor 32 is increased, and the zoom adjustment is implemented, so that the camera module 30 implements effect like the long focus length.

Correspondingly, when the lifting component 21 is in the second position, the first driving assembly 23 reversely rotates relative to the base 22, and the first driving assembly 23 drives the lifting component 21 and the first lens assembly 31 to reversely move, thereby compressing overall dimensions of the camera module 30 and the lifting component 21.

To be specific, synchronous driving of the movement of the lifting component 21 and the first lens assembly 31 can be implemented through the first driving assembly 23. Compared with driving mechanisms respectively disposed to drive the lifting component 21 and the first lens assembly 31 to move, one mechanism structure can drive the lifting component 21 and the first lens assembly 31 to move. The structure of the driving mechanism for implementing the movement of the lifting component 21 and the first lens assembly 31 is effectively simplified while implementing the long zoom distance. This helps reduce costs.

In addition, during the assembly of the electronic device, the second driving component 40 and the first lens assembly 31 may be assembled together (as shown in FIG. 11), that is, the second driving component 40 and the camera module 30 are assembled together, and the first driving assembly 23, the lifting component 21, the base 22, and the pressing cover 26 are assembled together to form the adjustment mechanism 20. With reference to FIG. 13, the adjustment mechanism 20 may be assembled together with the rear cover 11 through the pressing cover 26, and then the second driving component 40 and the first driving assembly 23 are aligned and match each other. In other words, after being separately assembled, the first lens assembly 31 and a driving mechanism thereof, and the lifting component 21 and a driving mechanism thereof are assembled, and decoupling of assembly of the first lens assembly 31 and the driving mechanism thereof and assembly of the lifting component 21 and the driving mechanism thereof is implemented. The lifting component 21 and the driving mechanism thereof are assembled together with the rear cover 11, and the first lens assembly 31 and the driving mechanism thereof are assembled together with the camera module 30, provided that the two parts are aligned and assembled when the electronic device is assembled as a whole. This can further reduce the precision requirement during the assembly of the electronic device, and better facilitate the assembly implementation.

Figure 14:
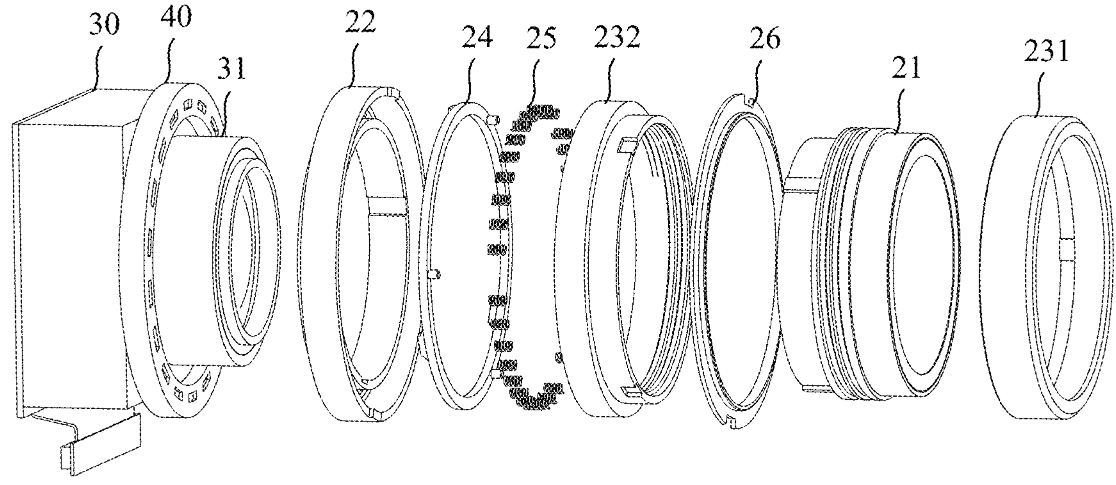
FIG. 14 is a schematic diagram of a disassembled structure of a camera module, a second driving component, and an adjustment mechanism of an electronic device according to an embodiment of this application.

FIG. 14 is a schematic diagram of a disassembled structure of the camera module, the second driving component, and the adjustment mechanism of the electronic device according to an embodiment of this application.

Specifically, refer to FIG. 14. The adjustment mechanism 20 may further include a first transmission component 24, and the first driving assembly 23 and the second driving component 40 may move accordingly by using the first transmission component 24. For example, the first driving assembly 23 includes the first driving component 232 and the first adjustment component 231. The first transmission component 24 may also be of the ring-shaped structure, and the first transmission component 24 may be located between the first driving component 232 and the base 22. With reference to FIG. 13, a first end of the first transmission component 24 may be coupled to the first driving component 232, and a second end of the first transmission component 24 may rotatably match the base 22, so that both the first driving assembly 23 and the first transmission component 24 can rotate relative to the base 22.

The first transmission component 24 may further be coupled to the second driving component 40, and the second driving component 40 is driven through rotation of the first transmission component 24 to rotate relative to the base 22, that is, the first driving assembly 23 and the second driving component 40 can move accordingly by using the first transmission component 24 while ensuring that the first driving assembly 23 can rotate relative to the base 22. This helps simplify a structure.

When the first driving component 232 in the first driving assembly 23 rotates relative to the base 22, the first driving component 232 can drive the lifting component 21 to move in the optical axis direction, and the first driving component 232 can further drive the first transmission component 24 to rotate relative to the base 22. The first transmission component 24 can drive the second driving component 40 to rotate relative to the base 22, so that the second driving component 40 drives the first lens assembly 31 to move in the optical axis direction, thereby implementing synchronous movement of the lifting component 21 and the first lens assembly 31.

Figure 15:
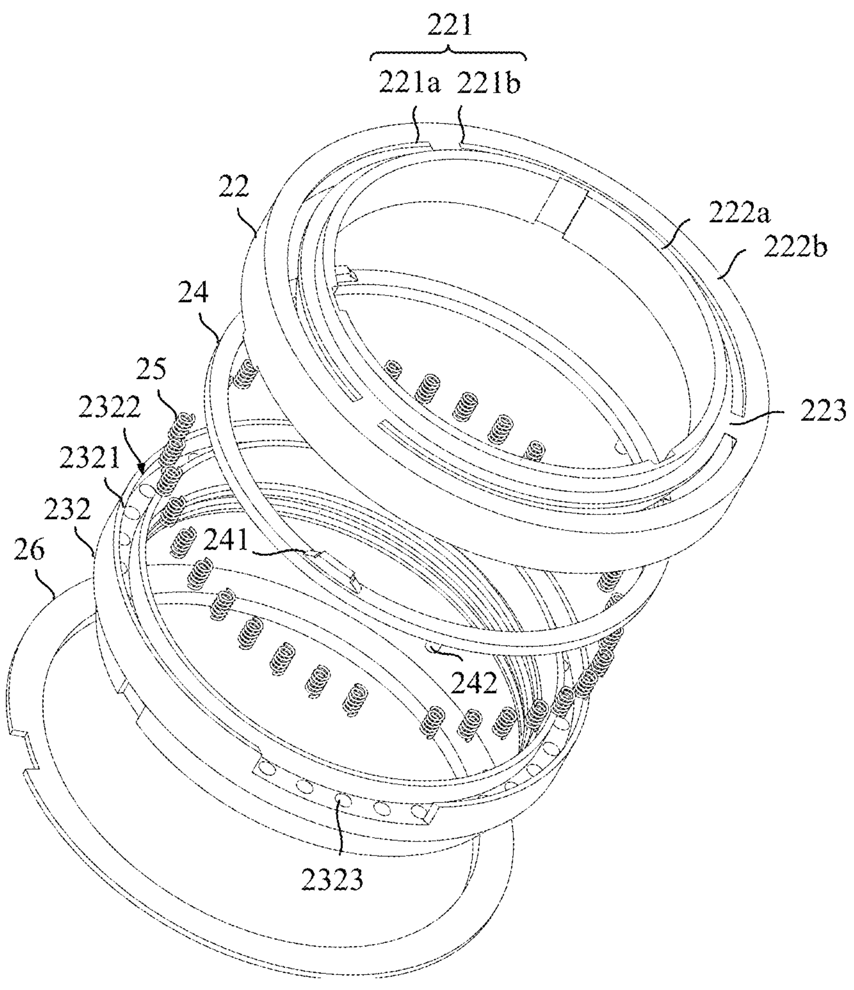
FIG. 15 is a schematic diagram of a disassembled structure of a first driving component, a first transmission component, and a base of an electronic device according to an embodiment of this application.

FIG. 15 is a schematic diagram of a disassembled structure of the first driving component, the first transmission component, and the base of the electronic device according to an embodiment of this application.

Specifically, refer to FIG. 15. A sliding rail 221 may be disposed in a circumferential direction of the base 22, and a sliding component 241 may be disposed on the second end of the first transmission component 24. The sliding component 241 may be a protrusion formed on an end surface of the second end of the first transmission component 24. The second end of the first transmission component 24 may extend into the base 22, and the sliding component 241 is located in the sliding rail 221 and moves along the sliding rail 221. In this way, rotational matching of the first transmission component 24 and the base 22 is implemented through matching of the sliding component 241 and the sliding rail 221.

The sliding rail 221 is distributed in the circumferential direction of the base 22, so that the first transmission component 24 can rotate relative to the base 22 for a plurality of circles, and the first driving assembly 23 can rotate relative to the base 22 for a plurality of circles. Therefore, movable distances of the lifting component 21 and the first lens assembly 31 in the optical axis direction are increased, a size of the expanded avoidance space can be increased, and the zoom distance of the first lens assembly 31 is further increased.

Still refer to FIG. 15. A first position-limiting component 2323 may be further disposed on the first driving component 232, a second position-limiting component 242 may be disposed on an end surface of the first end of the first transmission component 24, and the first position-limiting component 2323 matches the second position-limiting component 242. For example, the first position-limiting component 2323 may be a position-limiting hole disposed on an end surface of the first end of the first driving component 232, the second position-limiting component 242 may be a position-limiting column that is formed by protruding on the end surface of the first end of the first transmission component 24, and the position-limiting column may be inserted into the position-limiting hole. In this way, a connection between the first transmission component 24 and the first driving component 232 is implemented, and a connection and assembly of the first transmission component 24 and the first driving assembly 23 are implemented, so that the first transmission component 24 can be driven through the rotation of the first driving assembly 23 to rotate relative to the base 22.

To implement a connection between the first transmission component 24 and the second driving component 40, still refer to FIG. 15. The sliding rail 221 may penetrate the base 22, so that the sliding component 241 of the first transmission component 24 can be coupled to the second driving component 40 after passing through the base 22.

Specifically, the base 22 may include an inner ring part 222*a*, a partition part 223, and an outer ring part 222*b*. The outer ring part 222*b* may be disposed around an outer side of the inner ring part 222*a*, there is a gap between the inner ring part 222*a* and the outer ring part 222*b*, and the gap forms the sliding rail 221 that penetrates the base 22. The inner ring part 222*a* and the outer ring part 222*b* are coupled through the partition part 223. There may be one partition part 223, or there may be a plurality of partition parts 223. In this way, the partition part 223 divides the sliding rail 221 into a plurality of rail slots that penetrate the base 22, for example, a rail slot 221*a* and a rail slot 221*b*. The sliding component 241 on the first transmission component 24 may extend into the rail slot and slide along the rail slot.

To enable the sliding component 241 to sequentially slide in the rail slot, refer to FIG. 15. The adjustment mechanism 20 further includes an elastic component 25. The elastic component 25 may be disposed on the first driving component 232, and the elastic component 25 is located between the first transmission component 24 and the first driving component 232. The elastic component 25 can give the first transmission component 24 an expansion and contraction margin in the optical axis direction.

Specifically, a position-limiting slot 2322 may be disposed on the end surface of the first end of the first driving component 232, the position-limiting slot 2322 is distributed in the circumferential direction of the first driving component 232, and the first transmission component 24 and the elastic component 25 may be located in the position-limiting slot 2322. The position-limiting slot 2322 can perform a position-limiting function on the first transmission component 24 and the elastic component 25, to ensure that the first transmission component expands and contracts in the optical axis direction under the action of the elastic component, thereby ensuring smoothness of sequential sliding of the sliding component 241 in the rail slot. In addition, stability of a connection between the first transmission component 24 and the first driving assembly 23 can be improved.

Figure 16:
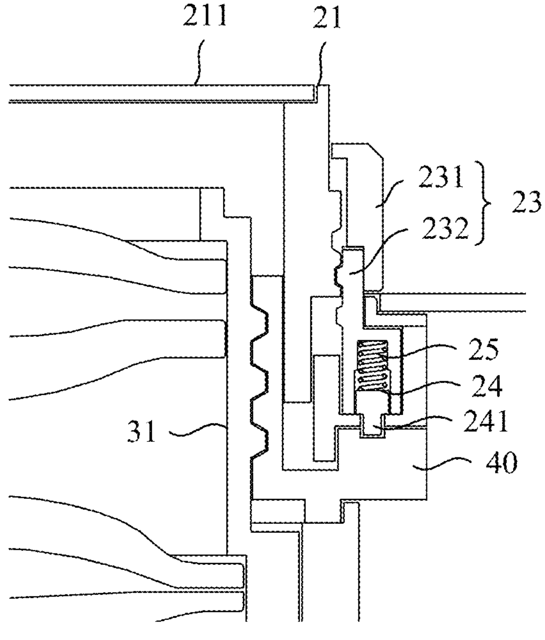
FIG. 16 is an enlarged diagram of a partial structure of a part d in FIG. 13.

FIG. 16 is an enlarged diagram of a partial structure of a part d in FIG. 13.

One end that is of the sliding component 241 and that is coupled to the first transmission component 24 is a first end of the sliding component 241, and one end opposite to the first end is a second end of the sliding component 241. When the sliding component 241 slides in the rail slot, with reference to FIG. 16, the second end of the sliding component 241 may pass through the rail slot on the base 22 and is coupled to the second driving component 40. In this way, when the first transmission component 24 rotates, the second driving component 40 can be driven to rotate, the first driving assembly 23 can drive, by using the first transmission component 24, the second driving component 40 to rotate, and further drive the first lens assembly 31 to move.

Figure 17:
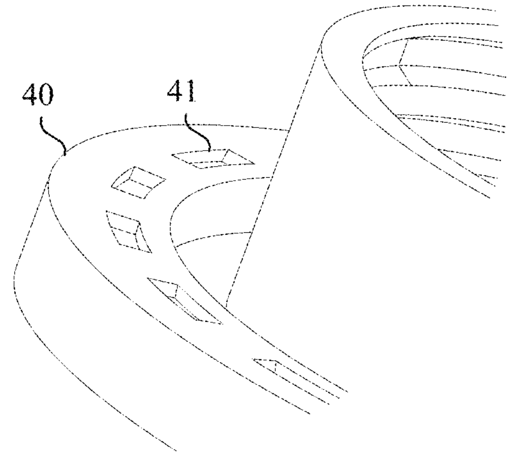
FIG. 17 is an enlarged diagram of a partial structure of a second driving component of an electronic device according to an embodiment of this application.

FIG. 17 is an enlarged diagram of a partial structure of the second driving component of the electronic device according to an embodiment of this application.

Specifically, refer to FIG. 17. A plurality of third position-limiting components 41 may be disposed on the second driving component 40, the plurality of third position-limiting components 41 are distributed in a circumferential direction of the second driving component 40, and when the sliding component 241 slides in the rail slot, with reference to FIG. 16, the sliding component 241 may pass through the rail slot and match the third position-limiting component 41. For example, the sliding component 241 may be the protrusion formed on the first transmission component 24, the third position-limiting component 41 may be a position-limiting slot formed on an end surface of an end that is of the second driving component 40 and that faces the first transmission component 24, and the sliding component 241 may extend into the position-limiting slot. In this way, the connection and assembly of the first transmission component 24 and the second driving component 40 are implemented, so that the first transmission component 24 can drive the second driving component 40 to rotate relative to the base 22.

In other words, during the assembly of the electronic device, the lifting component 21, the first driving assembly 23, the first transmission component 24, and the elastic component 25 may be assembled together through the base 22, the pressing cover 26, and the rear cover 11, and the first lens assembly 31 and the second driving component 40 may be assembled together. Then, the two parts are aligned, so that the sliding component 241 of the first transmission component 24 is inserted into the third position-limiting component 41 of the second driving component 40 to complete the assembly. This significantly reduces the assembly precision requirement and facilitates assembly.

A quantity of third position-limiting components 41 may be selected and set based on a quantity of rail slots and a quantity of partition parts 223.

Figure 18:
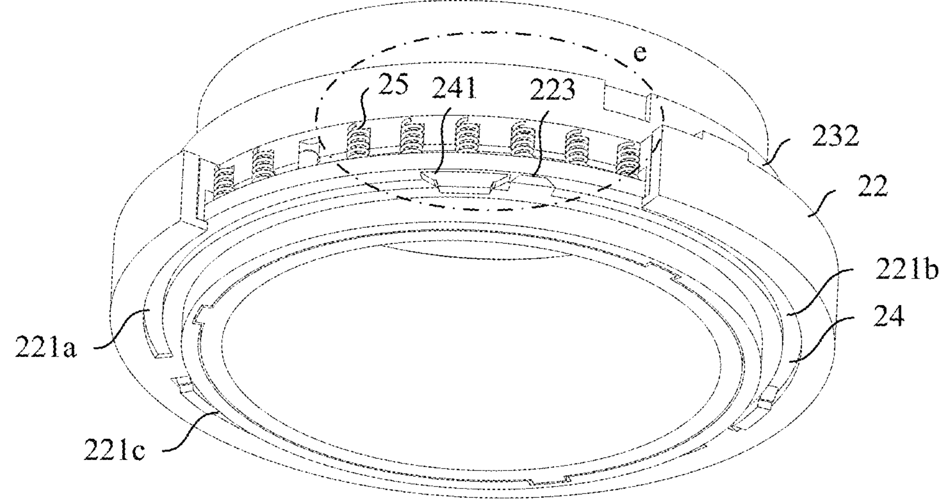
FIG. 18 is a schematic diagram of a partially sectional structure of a first transmission component, a base, and a first driving component of an electronic device match each other according to an embodiment of this application.

FIG. 18 is a schematic diagram of a partially sectional structure in which the first transmission component, the base, and the first driving component of the electronic device match each other according to an embodiment of this application.

When the sliding component 241 slides to the partition part 223, the sliding component 241 can continue to slide by using the elastic margin in the optical axis direction provided by the elastic component 25. Specifically, refer to FIG. 18. There are three partition parts 223 included in the bases 22, and the partition part 223 divides the sliding rail 221 into three rail slots, which are respectively the rail slot 221*a*, the rail slot 221*b*, and a rail slot 221*c*. The two adjacent rail slots 221*a* and 221*b* are used as an example. When the sliding component 241 on the first transmission component 24 slides along the rail slot 221*a* to the partition part 223, the partition part 223 squeezes the sliding component 241 because the first transmission component 24 matches the first driving component 232 by using the elastic component 25, so that the elastic component 25 is compressed to enable the sliding component 241 to detach the rail slot 221*a*. The first driving component 232 is continuously rotated, so that the sliding component 241 can slide through the partition part 223.

When the sliding component 241 slides through the partition part 223, squeezing of the partition part 223 disappears, and the elastic component 25 rebounds, so that the sliding component 241 slides into the rail slot 221*b* adjacent to the rail slot 221*a*. In this case, the sliding component 241 can continue to be coupled to the second driving component 40. In this way, the sliding component 241 can sequentially slide in the plurality of rail slots, to ensure that the first transmission component 24 can rotate relative to the base 22 for a plurality of circles, and increase the movable distances of the lifting component 21 and the first lens assembly 31.

There may be one sliding component 241, or there may be a plurality of sliding components 241. When there are a plurality of sliding components 241, the plurality of sliding components 241 may be spaced and evenly distributed in a circumferential direction of the first transmission component 24.

The elastic component 25 may be a spring, or the elastic component 25 may be another structural component with an elastic expansion and contraction amount. For example, the elastic component 25 may be elastic rubber. There may also be one elastic component 25. For example, the elastic component 25 is a ring-shaped structural component. Alternatively, there may be a plurality of elastic components 25, and the plurality of elastic components 25 are distributed in the circumferential direction of the first driving component 232.

A position-limiting part 2321 is further disposed on the first driving component 232 (as shown in FIG. 15). Specifically, the position-limiting part 2321 may be disposed on a bottom wall of the position-limiting slot 2322. For example, the position-limiting part 2321 may be a position-limiting hole disposed on the bottom wall of the position-limiting slot 2322, and the elastic component 25 is disposed in the position-limiting part 2321. The position-limiting part 2321 can perform the position-limiting function on the elastic component 25, to ensure that the elastic component 25 is compressed or rebounds in the optical axis direction, and ensure that the sliding component 241 can smoothly slide from one rail slot to an adjacent rail slot, thereby further improving sliding smoothness of the sliding component 241.

Figure 19:
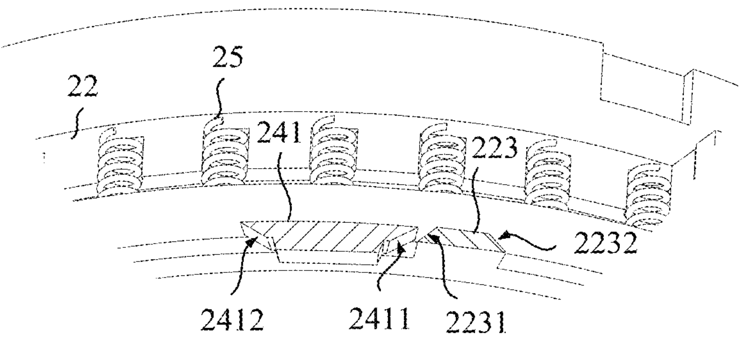
FIG. 19 is an enlarged diagram of a partial structure of a part e in FIG. 18.

FIG. 19 is an enlarged diagram of a partial structure of a part e in FIG. 18.

Refer to FIG. 19. There is one partition part 223 between two adjacent rail slots. The partition part 223 has a first side wall surface 2231 and a second side wall surface 2232 that are opposite, and the sliding component 241 has a third side wall surface 2411 and a fourth side wall surface 2412 that are opposite. When the sliding component 241 rotates in the rail slot, for example, the sliding component 241 rotates in a clockwise direction, and the sliding component 241 slides to the partition part 223, that the first side wall surface 2231 first presses against the third side wall surface 2411 is used as an example. After the first side wall surface 2231 presses against the third side wall surface 2411, the sliding component 241 continues to rotate, and the partition part 223 squeezes the sliding component 241 and the elastic component 25.

The first side wall surface 2231 may have a first inclined surface, the third side wall surface 2411 may have a third inclined surface, along a clockwise sliding direction of the sliding component 241, the first inclined surface inclines toward a direction close to the elastic component 25, and an inclined direction of the third inclined surface is consistent with an inclined direction of the first inclined surface. This helps the partition part 223 squeeze the sliding component 241 and the elastic component 25, so that the sliding component 241 slides through the partition part 223 and into an adjacent rail slot to continue sliding, thereby improving the sliding smoothness of the sliding component 241.

The second side wall surface 2232 may have a second inclined surface, the fourth side wall surface 2412 may have a fourth inclined surface, and inclined directions of the second inclined surface and the fourth inclined surface may be consistent. In addition, the inclined direction of the second inclined surface is opposite to the inclined direction of the first inclined surface, and the inclined directions of the third inclined surface and the fourth inclined surface are opposite. In this way, when the sliding component 241 reversely rotates to shrink the lifting component 21, implementation of the squeezing of the sliding component 241 and the elastic component 25 by the partition part 223 can be facilitated, thereby ensuring smoothness of rotation of the sliding component 241.

The following describes a moving scenario that can be implemented by the lifting component and the first lens assembly of the electronic device.

Figure 20:
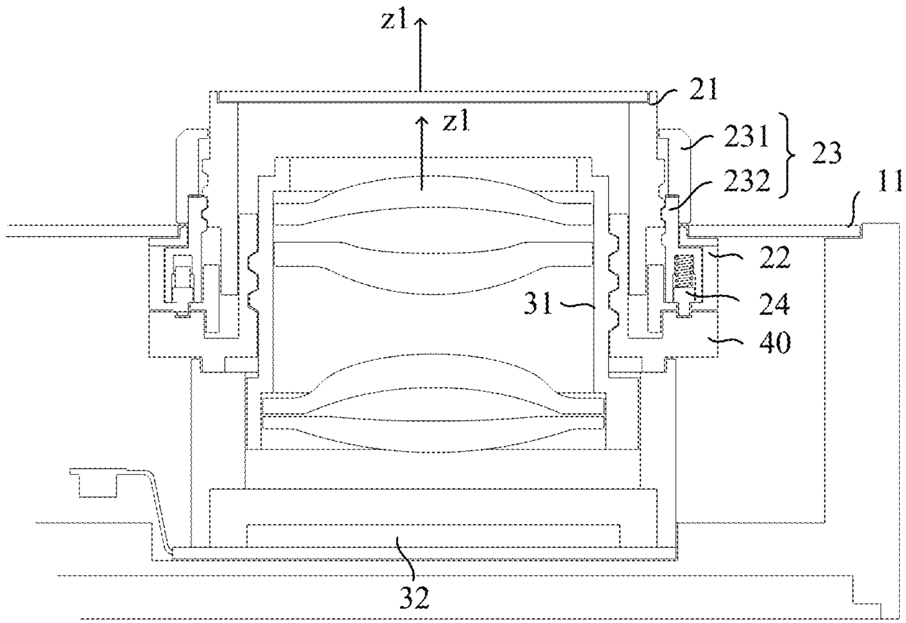
FIG. 20 is another schematic diagram of a sectional structure of an electronic device according to an embodiment of this application.

FIG. 20 is another schematic diagram of a sectional structure of the electronic device according to an embodiment of this application.

In this embodiment of this application, the lifting component 21 and the first lens assembly 31 can be driven through the rotation of the first driving assembly 23 to synchronously move in the optical axis direction. Specifically, when the first driving assembly 23 is rotated in one direction, moving directions of the lifting component 21 and the first lens assembly 31 may be the same, or moving directions may be opposite.

For example, refer to FIG. 20. When the first driving assembly 23 rotates relative to the base 22 in a clockwise direction, the lifting component 21 may move in the first direction (the z1 in the figure). The first driving assembly 23 can further drive, by using the first transmission component 24, the second driving component 40 to rotate, and the second driving component 40 may drive the first lens assembly 31 to also move in the first direction. When the lifting component 21 moves to vacate the avoidance space, the first lens assembly 31 can be driven to move in the avoidance space to achieve the effect like the long focus length. This has good practicability.

Correspondingly, when the first driving assembly 23 rotates counterclockwise relative to the base 22, both the lifting component 21 and the first lens assembly 31 may move in a second direction, where the first direction is opposite to the second direction.

Specifically, the moving direction of the lifting component 21 may be adjusted by adjusting a matching manner between the first driving assembly 23 and the lifting component 21. Correspondingly, the moving direction of the first lens assembly 31 may also be adjusted by adjusting how the second driving component 40 and the first lens assembly 31 move accordingly. For example, the first driving assembly 23 moves accordingly through the matching of the first helical rail and the second helical rail on the lifting component 21, and the second driving assembly 27 moves accordingly through the matching of the third helical rail and the fourth helical rail on the first lens assembly 31, to make an extension direction of the first helical rail on the first driving assembly 23 consistent with an extension direction of the third helical rail on the second driving component 40, so that the moving direction of the lifting component 21 is consistent with the moving direction of the first lens assembly 31.

Figure 21:
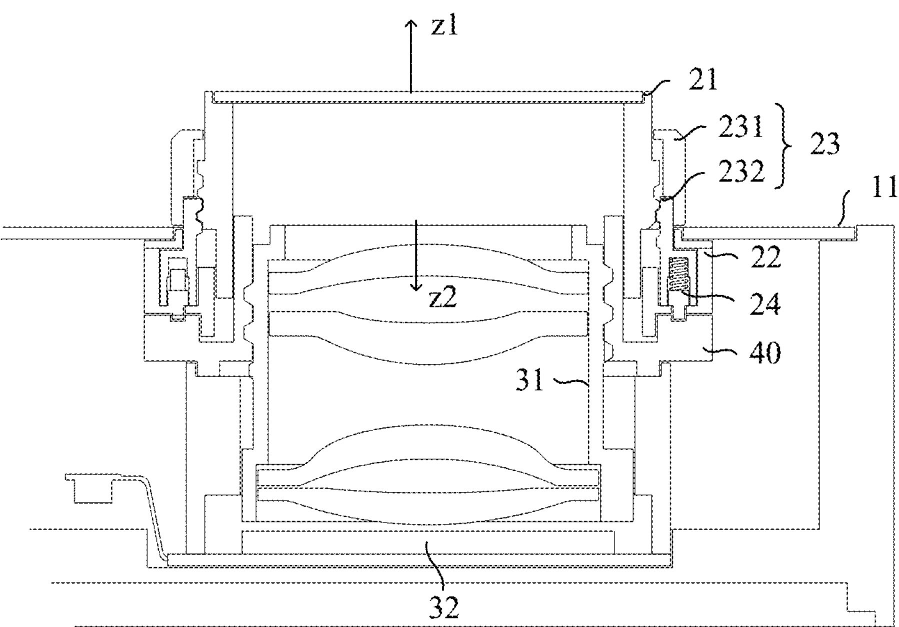
FIG. 21 is a schematic diagram of a sectional structure of another electronic device according to an embodiment of this application.

FIG. 21 is a schematic diagram of a sectional structure of another electronic device according to an embodiment of this application.

Alternatively, refer to FIG. 21. When the first driving assembly 23 rotates clockwise relative to the base 22, the lifting component 21 may move in the first direction (the z1 in the figure). The first driving assembly 23 can further drive, by using the first transmission component 24, the second driving component 40 to rotate, and the second driving component 40 drives the first lens assembly 31 to move in the second direction, where the second direction is opposite to the first direction, for example, the z2 direction in FIG. 20. A usage scenario like photographing that can be implemented by the electronic device is enriched. This helps improve functionality and applicability of the electronic device.

Correspondingly, the moving direction may also be adjusted by adjusting how the first driving assembly 23 and the lifting component 21 match and how the second driving component 40 and the first lens assembly 31 move accordingly. For example, the extension direction of the first helical rail on the first driving assembly 23 is made opposite to the extension direction of the third helical rail on the second driving component 40, so that the moving direction of the lifting component 21 is opposite to the moving direction of the first lens assembly 31.

Figure 22:
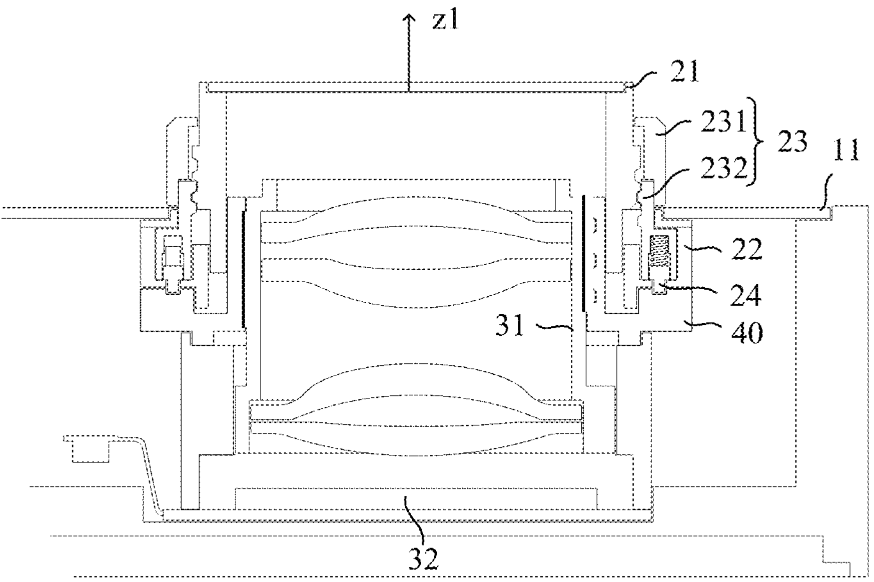
FIG. 22 is a schematic diagram of a sectional structure of still another electronic device according to an embodiment of this application.
Figure 23:
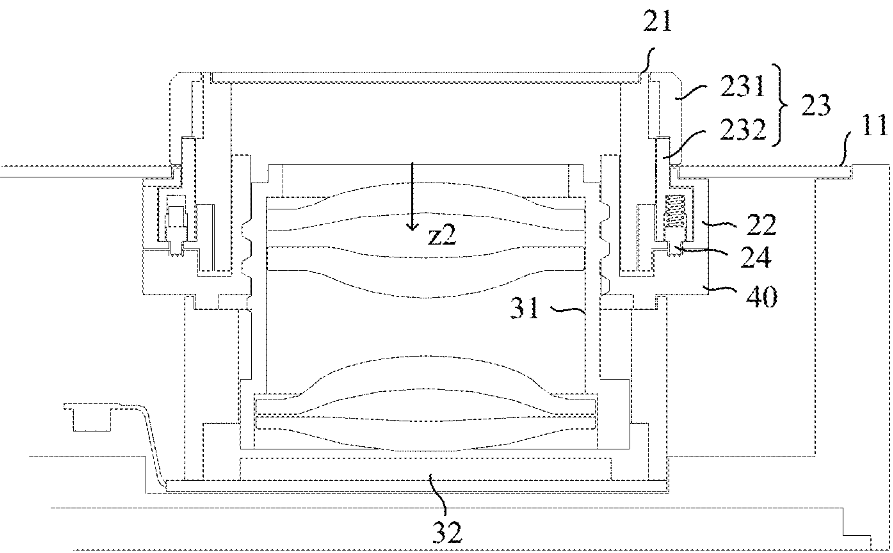
FIG. 23 is a schematic diagram of a sectional structure of yet another electronic device according to an embodiment of this application.

FIG. 22 is a schematic diagram of a sectional structure of still another electronic device according to an embodiment of this application, and FIG. 23 is a schematic diagram of a sectional structure of yet another electronic device according to an embodiment of this application.

Certainly, as described above, in a possible implementation, the lifting component 21 and the first lens assembly 31 may separately move. For example, the first lens assembly 31 moves along the optical axis by disposing the first driving structure in the electronic device 100, and the lifting component 21 moves by using the first driving assembly 23. In this case, the moving directions of the lifting component 21 and the first lens assembly 31 may be the same or opposite.

Alternatively, in a possible implementation, only the lifting component 21 may move. For example, refer to FIG. 22. The first driving assembly 23 moves accordingly with the lifting component 21, and the first driving assembly 23 is decoupled from the first lens assembly 31. When the first driving assembly 23 rotates relative to the base 22, the first driving assembly 23 drives the lifting component 21 to move in the optical axis direction, but the first lens assembly 31 may not move.

Alternatively, only the first lens assembly 31 may move, and the first lens assembly 31 may be separately driven, by using the first driving structure, to move. Alternatively, refer to FIG. 23. The lifting component 21 and the first driving assembly 23 may not move accordingly. For example, the first helical rail and the second helical rail are not disposed on the lifting component 21 and the first driving assembly 23, so that the lifting component 21 is decoupled from the first driving assembly 23. When the first driving assembly 23 rotates relative to the housing 10, the first driving assembly 23 drives, by using the first transmission component 24, the second driving component 40 to rotate, and the second driving component 40 drives the first lens assembly 31 to move in the optical axis direction.

Figure 24:
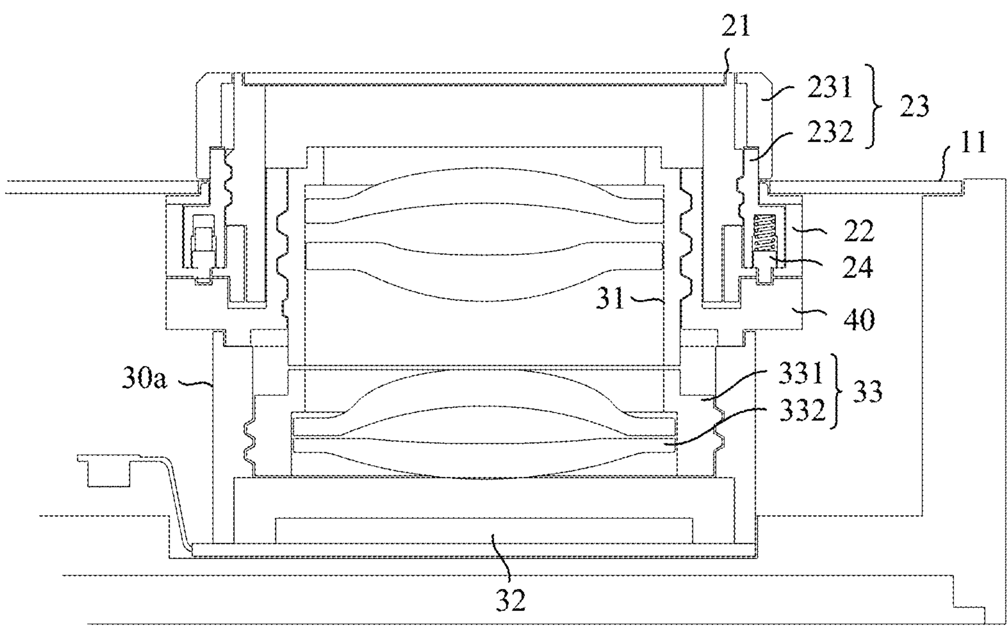
FIG. 24 is a schematic diagram of a sectional structure of still yet another electronic device according to an embodiment of this application.

FIG. 24 is a schematic diagram of a sectional structure of still yet another electronic device according to an embodiment of this application.

In this embodiment of this application, the camera module 30 may include a plurality of lens assemblies. For example, refer to FIG. 24. The electronic device 100 may further include a second lens assembly 33, and the second lens assembly 33 may also be disposed on the outer housing 30*a*. An optical axis of the second lens assembly 33 may coincide with the optical axis of the first lens assembly, and the second lens assembly 33 is located on a side that is of the first lens assembly 31 and that faces an image side.

The second lens assembly 33 may include a second lens support 331 and a second lens component 332 disposed in the second lens support 331. There may be one second lens component 332, or there may be a plurality of second lens components 332. For example, there are a plurality of second lens components 332, and the plurality of second lens components 332 are sequentially arranged in the optical axis direction.

The second lens assembly 33 may also move relative to the outer housing 30*a* in the optical axis direction, that is, the second lens assembly 33 can also move relative to the image sensor 32, to adjust a distance between the second lens assembly 33 and the image sensor 32, and implement zooming. This helps further improve the zoom effect, enrich functions of the camera module 30, and improve the photographing effect.

The second lens assembly 33 may separately move. For example, a second driving mechanism may be further disposed in the electronic device. The second driving mechanism is coupled to the second lens assembly 33, and the second lens assembly 33 is driven, by using the second driving mechanism, to move in the optical axis direction.

Figure 25:
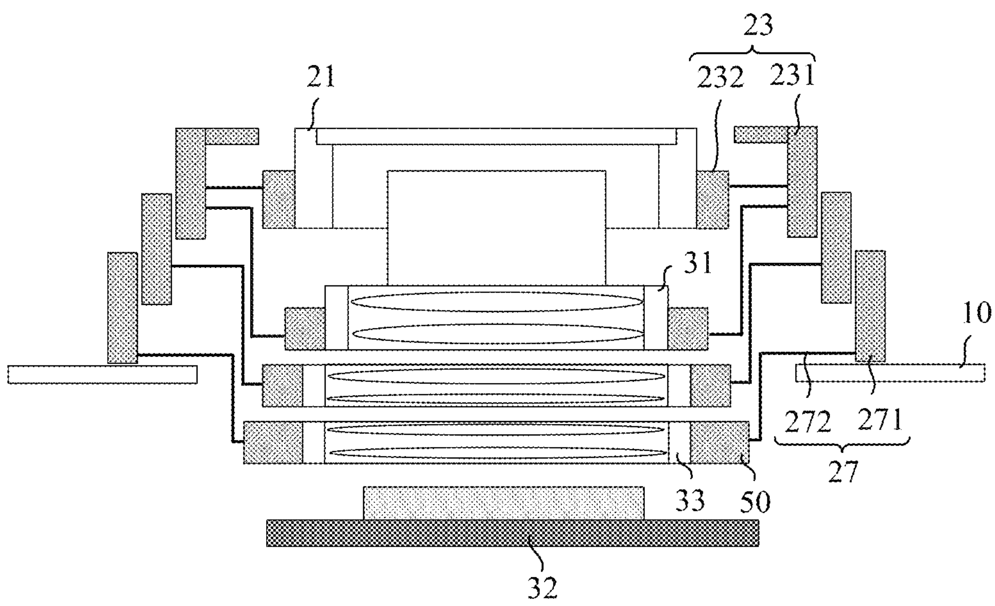
FIG. 25 is a schematic diagram of a sectional structure of a further electronic device according to an embodiment of this application.

FIG. 25 is a schematic diagram of a sectional structure of a further electronic device according to an embodiment of this application.

Alternatively, refer to FIG. 25. The electronic device may further include a third driving component 50. The third driving component 50 is rotatably disposed in an accommodation cavity 112. For example, the third driving component 50 may rotatably match an outer housing of a camera module 30, so that the third driving component 50 can rotate relative to a base 22 and a housing 10.

The third driving component 50 is sleeved on a second lens assembly 33. Specifically, the third driving component 50 may be sleeved on an outer side of the second lens assembly 33, and moves accordingly with the second lens assembly 33. When the third driving component 50 rotates relative to the base 22, the second lens assembly 33 can be driven to move in an optical axis direction, thereby implementing zoom effect. Specifically, the third driving component 50 and the second lens assembly 33 may alternatively move accordingly by using a rail structure or the like.

For example, a fifth helical rail may be formed on an inner side wall of the third driving component 50, a sixth helical rail may be formed on an outer side wall of the second lens assembly 33, and the fifth helical rail may match the sixth helical rail, so that the third driving component 50 and the second lens assembly 33 can move accordingly. When the third driving component 50 rotates relative to the base 22, the fifth helical rail rotates relative to the sixth helical rail, to generate movement in the optical axis direction, thereby driving the second lens assembly 33 to move relative to the housing 10 in the optical axis direction.

The electronic device may further include a second driving assembly 27. The second driving assembly 27 may be disposed around a circumferential direction of a first driving assembly 23, the second driving assembly 27 rotatably matches the base 22, and the second driving assembly 27 moves accordingly with the third driving component 50. It should be understood that a manner in which the second driving assembly 27 rotatably matches the base 22 may be the same as a manner in which the first driving assembly 23 rotatably matches the base 22, or the second driving assembly 27 may rotatably match the base 22 in another manner.

When the second driving assembly 27 rotates relative to the base 22, the second driving assembly 27 drives the third driving component 50 to rotate relative to the base 22, so that the third driving component 50 can drive the second lens assembly 33 to move in the optical axis direction. In other words, a lifting component 21 and a first lens assembly 31 can be driven through the rotation of the first driving assembly 23 to move, and t the second lens assembly 33 can be driven through the rotation of the second driving assembly 27 to move, so that the lifting component 21, the first lens assembly 31, and the second lens assembly 33 are separately driven to move. A movement driving manner is enriched, and design flexibility of the electronic device is increased.

When the second lens assembly 33 separately moves, a moving direction of the second lens assembly 33 and a moving direction of the lifting component 21 may be the same, or may be opposite. Correspondingly, the moving direction of the second lens assembly 33 and the moving direction of the first lens assembly 31 may also be the same, or may also be opposite.

It should be noted that there may be one second lens assembly 33 (as shown in FIG. 24), or there may be a plurality of second lens assemblies 33. Refer to FIG. 25. When there are a plurality of second lens assemblies 33, each second lens assembly 33 may correspondingly match one third driving component 50, and each third driving component 50 correspondingly matches one second driving assembly 27, so that the second driving assembly 27 separately drives the plurality of second lens assemblies 33 to move.

Still refer to FIG. 25. The second driving assembly 27 may include a second adjustment component 271 and a second transmission component 272. The second adjustment component 271 may be located outside the housing 10, and the second adjustment component 271 may be disposed around a circumferential direction of a first adjustment component 231. The second adjustment component 271 may be coupled to the third driving component 50 through the second transmission component 272. In this way, the third driving component 50 can be driven to rotate relative to the base 22 by rotating the second adjustment component 271, and further, the third driving component 50 drives the second lens assembly 33 to move through. This helps implement the assembly of the second driving assembly 27, the base, the housing 10, and the like.

Structures of the second transmission component 272 and the second adjustment component 271 may be respectively the same as structures of a first transmission component 24 and the first adjustment component 231, and a matching manner between the second transmission component 272 and the first adjustment component 231 may be the same as a matching manner between the first transmission component 24 and the first driving component 232. A matching manner between the second transmission component 272 and the third driving component 50 may be the same as a matching manner between the first transmission component 24 and the second driving component 40. Details are not described again in this example.

Alternatively, the second lens assembly 33 may move accordingly with the lifting component 21. For example, the second driving component 40 may also move accordingly with the second lens assembly 33, and a matching manner between the second driving component 40 and the second lens assembly 33 may be the same as a matching manner between the second driving component 40 and the first lens assembly 31.

In this way, when the first driving assembly 23 rotates relative to the base 22, the first driving assembly 23 can drive the lifting component 21 to move in the optical axis direction, the first driving assembly 23 can drive the second driving component 40 to rotate relative to the base 22, and the first lens assembly 31 and the second lens assembly 33 are driven to move in the optical axis direction, so that the lifting component 21, the first lens assembly 31, and the second lens assembly 33 can move accordingly.

In other words, synchronous movement of the lifting component 21, the first lens assembly 31, and the second lens assembly 33 is driven by using a simple mechanical mechanism. A structure of a driving mechanism is significantly simplified while implementing a good zoom distance. This facilitates the implementation and helps reduce the costs.

It should be understood that, when the second lens assembly 33 moves accordingly with the lifting component 21 and the first lens assembly 31, the moving direction of the second lens assembly 33, the moving direction of the lifting component 21, and the moving direction of the first lens assembly 31 may all be the same, or may all be opposite. Alternatively, the moving directions of any two may be the same, or the moving directions of any two may be opposite. A specific moving direction may be selected and set based on a requirement of a photographing function.

Finally, it should be noted that the foregoing embodiments are merely intended for describing the technical solutions of embodiments of this application other than limiting embodiments of this application. Although embodiments of this application are described in detail with reference to the foregoing embodiments, a person of ordinary skill in the art should understand that modifications may still be made to the technical solutions described in the foregoing embodiments or equivalent replacements may be made to some or all technical features thereof, without departing from the scope of the technical solutions of embodiments of this application.

The invention claimed is:

1. An electronic device with a movable lifting component, having a housing and a camera module, the housing including a middle frame and a rear cover, the middle frame and the rear cover enclosing an accommodation cavity, the camera module being disposed in the accommodation cavity, an avoidance hole communicating with the accommodation cavity being provided on the rear cover, and the camera module including a first lens assembly, comprising:

a base;

a lifting component; and a first driving assembly, wherein a light transmission component is disposed on the lifting component, the light transmission component is opposite to the avoidance hole, and the light transmission component is located on a side that is of the first lens assembly and that faces an object side, wherein the base is located in the accommodation cavity and is fastened to the rear cover of the housing, the base and the first driving assembly are of ring-shaped structures, the first driving assembly is disposed on the base and may rotate relative to the base, and the lifting component is sleeved on an inner side of the first driving assembly and moves accordingly with the first driving assembly, and wherein when the first driving assembly rotates relative to the base, the first driving assembly drives the lifting component to move in a first direction toward the outside of the housing to form an avoidance space, the first direction is parallel to an optical axis direction of the first lens assembly, and the first lens assembly may move in the avoidance space.

2. The electronic device according to claim 1, wherein at least a part of the first driving assembly is located outside the housing.

3. The electronic device according to claim 2, wherein the first driving assembly comprises a first driving component and a first adjustment component, a first end of the first driving component is disposed on the base and rotatably matches the base, the lifting component is sleeved on an inner side of the first driving component, the first adjustment component is sleeved on an outer side of a second end of the first driving component and is coupled to the first driving component, the first adjustment component drives the first driving component to rotate relative to the base, and at least a part of the first adjustment component is located outside the housing.

4. The electronic device according to claim 1, further comprising:

a second driving component rotatably disposed in the accommodation cavity, wherein the second driving component is sleeved on an outer side of the first lens assembly and moves accordingly with the first lens assembly, and the second driving component moves accordingly with the first driving assembly, and when the first driving assembly rotates relative to the base, the first driving assembly further drives the second driving component to rotate relative to the base, and the second driving component drives the first lens assembly to move in the first direction.

5. The electronic device according to claim 4, wherein the camera module further comprises a second lens assembly, and an optical axis of the second lens assembly coincides with an optical axis of the first lens assembly, and the second lens assembly is located on an image side of the first lens assembly, and wherein the second driving component further moves accordingly with the second lens assembly, and when the second driving component rotates relative to the base, the second driving component further drives the second lens assembly to move in the optical axis direction.

6. The electronic device according to claim 4, wherein the camera module further comprises a second lens assembly, and an optical axis of the second lens assembly coincides with an optical axis of the first lens assembly, and the second lens assembly is located on an image side of the first lens assembly, wherein the electronic device further comprises a third driving component and a second driving assembly, wherein the third driving component is rotatably disposed in the accommodation cavity, and the third driving component is sleeved on an outer side of the second lens assembly and moves accordingly with the second lens assembly, wherein the second driving assembly is disposed around a circumferential direction of the first driving assembly, the second driving assembly rotatably matches the base, and the second driving assembly moves accordingly with the third driving component, and wherein when the second driving assembly rotates relative to the base, the second driving assembly drives the third driving component to rotate relative to the base, and the third driving component drives the second lens assembly to move in the optical axis direction.

7. The electronic device according to claim 4, further comprising:

a first transmission component, wherein a first end of the first transmission component is coupled to the first driving assembly, a second end of the first transmission component rotatably matches the base, and the first transmission component is coupled to the second driving component, and wherein when the first driving assembly rotates relative to the base, the first driving assembly drives the first transmission component to rotate relative to the base, and the first transmission component drives the second driving component to rotate relative to the base.

8. The electronic device according to claim 7, wherein a sliding rail is disposed in a circumferential direction of the base, a sliding component is disposed on the second end of the first transmission component, and the sliding component is located in the sliding rail and slides along the sliding rail.

9. The electronic device according to claim 8, further comprising:

an elastic component, wherein the elastic component is disposed on the first driving assembly, and the elastic component is located between the first end of the first transmission component and the first driving assembly, wherein the base comprises an inner ring part, a partition part, and an outer ring part, the outer ring part is disposed around an outer side of the inner ring part, a gap is formed between the inner ring part and the outer ring part to form the sliding rail, the inner ring part and the outer ring part are coupled through the partition part, the partition part divides the sliding rail into a plurality of rail slots, and the sliding component sequentially slides in the plurality of rail slots, wherein when the sliding component slides in the rail slot, a part of the sliding component passes through the rail slot and is coupled to the second driving component, wherein when the sliding component slides along one rail slot to the partition part, the elastic component is compressed to enable the sliding component to detach the rail slot and slide through the partition part, and wherein when the sliding component slides through the partition part, the elastic component rebounds, so that the sliding component slides into another adjacent rail slot.

10. The electronic device according to claim 9, wherein the partition part comprises a first side wall surface and a second side wall surface that are opposite, the sliding component comprises a third side wall surface and a fourth side wall surface that are opposite, and when the sliding component slides to the partition part, the first side wall surface presses against the third side wall surface, wherein the first side wall surface has a first inclined surface, the third side wall surface has a third inclined surface, and along a sliding direction of the sliding component, the first inclined surface and the third inclined surface incline toward a direction close to the elastic component, and wherein the second side wall surface has a second inclined surface, the fourth side wall surface has a fourth inclined surface, and inclined directions of the second inclined surface and the fourth inclined surface are the same, and are both opposite to inclined directions of the first inclined surface and the third inclined surface.

11. The electronic device according to claim 9, wherein a position-limiting slot is disposed in the circumferential direction of the first driving assembly, and the first transmission component and the elastic component are located in the position-limiting slot.

12. The electronic device according to claim 11, wherein a position-limiting part is disposed on a bottom wall of the position-limiting slot, the elastic component is disposed in the position-limiting part, and the first transmission component presses against the elastic component.

13. The electronic device according to claim 7, wherein a first position-limiting component is further disposed on the first driving assembly, a second position-limiting component matching the first position-limiting component is disposed on the first end of the first transmission component, and the first transmission component and the first driving assembly are coupled through matching of the first position-limiting component and the second position-limiting component.

14. The electronic device according to claim 8, wherein a plurality of third position-limiting components matching the sliding component are disposed on the second driving component, the plurality of third position-limiting components are distributed in a circumferential direction of the second driving component, and the first transmission component and the second driving component are coupled through matching of the sliding component and the third position-limiting component.

15. The electronic device according to claim 6, wherein the second driving assembly comprises a second adjustment component and a second transmission component, the second adjustment component is located outside the housing, the second adjustment component is disposed around the first adjustment component of the first driving assembly, and the second adjustment component is coupled to the third driving component through the second transmission component, to drive, by using the second adjustment component, the third driving component to rotate relative to the base.

16. The electronic device according to claim 1, wherein a first helical rail is disposed on an inner side wall of the first driving assembly, a second helical rail matching the first helical rail is disposed on an outer side wall of the lifting component, and the first driving assembly moves accordingly with the lifting component through matching of the first helical rail and the second helical rail, and wherein the light transmission component is located on a first end of the lifting component, a second end of the lifting component passes through the first driving assembly and extends into the base, a guiding rail is disposed on an inner side wall of the base, the guiding rail extends in the first direction, a guiding component is further disposed on an outer side wall of the second end of the lifting component, and the guiding component can slide along the guiding rail.

17. The electronic device according to claim 4, wherein the second driving component is sleeved on an outer side of the first lens assembly, a third helical rail is disposed on an inner side wall of the second driving component, a fourth helical rail matching the third helical rail is disposed on an outer side wall of the first lens assembly, and the second driving component moves accordingly with the first lens assembly through matching of the third helical rail and the fourth helical rail.

18. The electronic device according to claim 1, further comprising:

a pressing cover, wherein a convex pressing platform is disposed on an outer side wall of the circumferential direction of the first driving assembly, the pressing cover is sleeved on an outer side of the first driving assembly and presses against the pressing platform, and the pressing cover is pressed on a side that is of the pressing platform and that faces away from the base, and wherein the pressing cover is fastened to the base, and the base is fastened to the housing through the pressing cover.

19. The electronic device according to claim 3, wherein a first clamping component is disposed on an inner side wall of the first adjustment component, a second clamping component matching the first clamping component is disposed on an outer side wall of a second end of the first driving component, and the first adjustment component and the first driving component are coupled through matching of the first clamping component and the second clamping component.

20. The electronic device according to claim 1, further comprising:

a control component movably disposed on the housing, wherein the control component is located outside the housing, and the control component moves accordingly with the first driving assembly.

* * * * *